(12) United States Patent
Hagirahim

(10) Patent No.: US 6,449,284 B1
(45) Date of Patent: Sep. 10, 2002

(54) METHODS AND MEANS FOR MANAGING MULTIMEDIA CALL FLOW

(75) Inventor: Hassan Hagirahim, Long Branch, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/064,681

(22) Filed: Apr. 22, 1998

Related U.S. Application Data

(63) Continuation of application No. 08/822,125, filed on Mar. 21, 1997.

(51) Int. Cl.⁷ .............................................. H04L 12/50
(52) U.S. Cl. ..................................... 370/466; 370/522
(58) Field of Search ............................... 370/260, 264, 370/395, 401, 410, 426, 466, 467, 522; 379/268, 269, 202, 205, 93.15, 100.13; 709/227, 228, 229, 230

(56) References Cited

U.S. PATENT DOCUMENTS

| | | | | |
|---|---|---|---|---|
| 5,208,811 A | * | 5/1993 | Kashio et al. ............... | 370/401 |
| 5,563,882 A | * | 10/1996 | Brouno et la. .............. | 370/260 |
| 5,625,407 A | * | 4/1997 | Biggs et al. ................ | 370/260 |
| 5,659,542 A | * | 8/1997 | Bell et al. ................... | 370/496 |
| 5,689,553 A | * | 11/1997 | Ahuja et al. ................ | 370/260 |
| 5,689,641 A | * | 11/1997 | Ludwig et al. ............. | 370/260 |
| 5,737,333 A | * | 4/1998 | Civanlar et al. ............ | 370/395 |
| 5,764,750 A | * | 6/1998 | Chau et al. ................. | 370/467 |
| 5,812,552 A | * | 9/1998 | Arora et al. ................ | 370/395 |
| 6,125,123 A | * | 9/2000 | Furuno ....................... | 370/352 |

OTHER PUBLICATIONS

Perez et al., ATM Signaling Support for IP over ATM, RFC 1755, Feb. 1995, IETF, pp. 1–32.*

Chao et al., IP on ATM Local Area Networks, Jun. 1994, IEEE, pp. 1–15.*

* cited by examiner

*Primary Examiner*—Wellington Chin
*Assistant Examiner*—Frank Duong

(57) ABSTRACT

Managing multi-media call flows involves establishing a call in an environment having a first signaling protocol to an environment having a second signaling protocol, identifying in the first signaling protocol that the call is going to the environment having the second signaling protocol, replacing a first signaling element of the first signaling protocol with a corresponding second signal element of the second protocol, and completing the call on the basis of the first signaling protocol with the corresponding second signaling element of the second protocol.

13 Claims, 20 Drawing Sheets

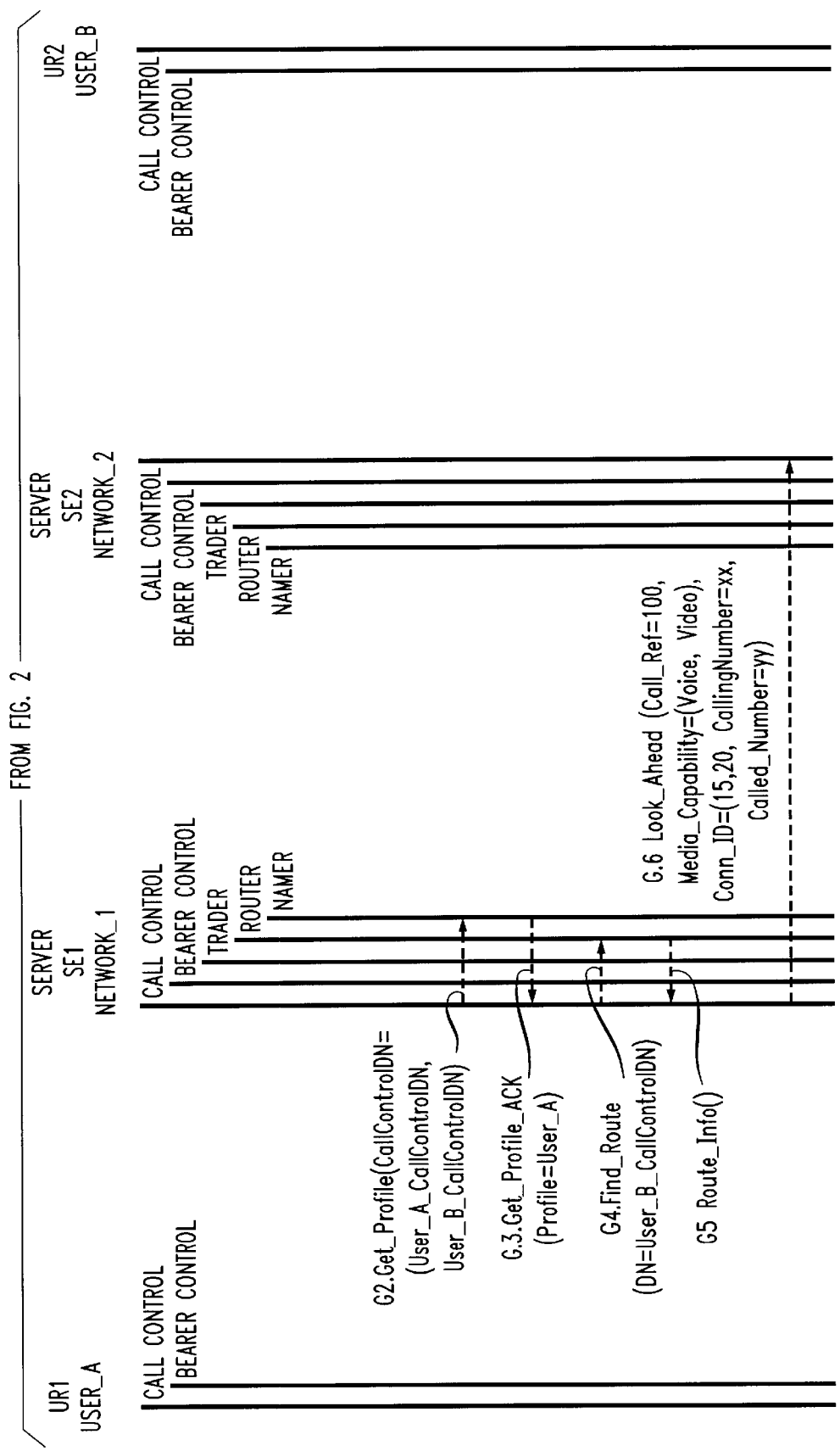

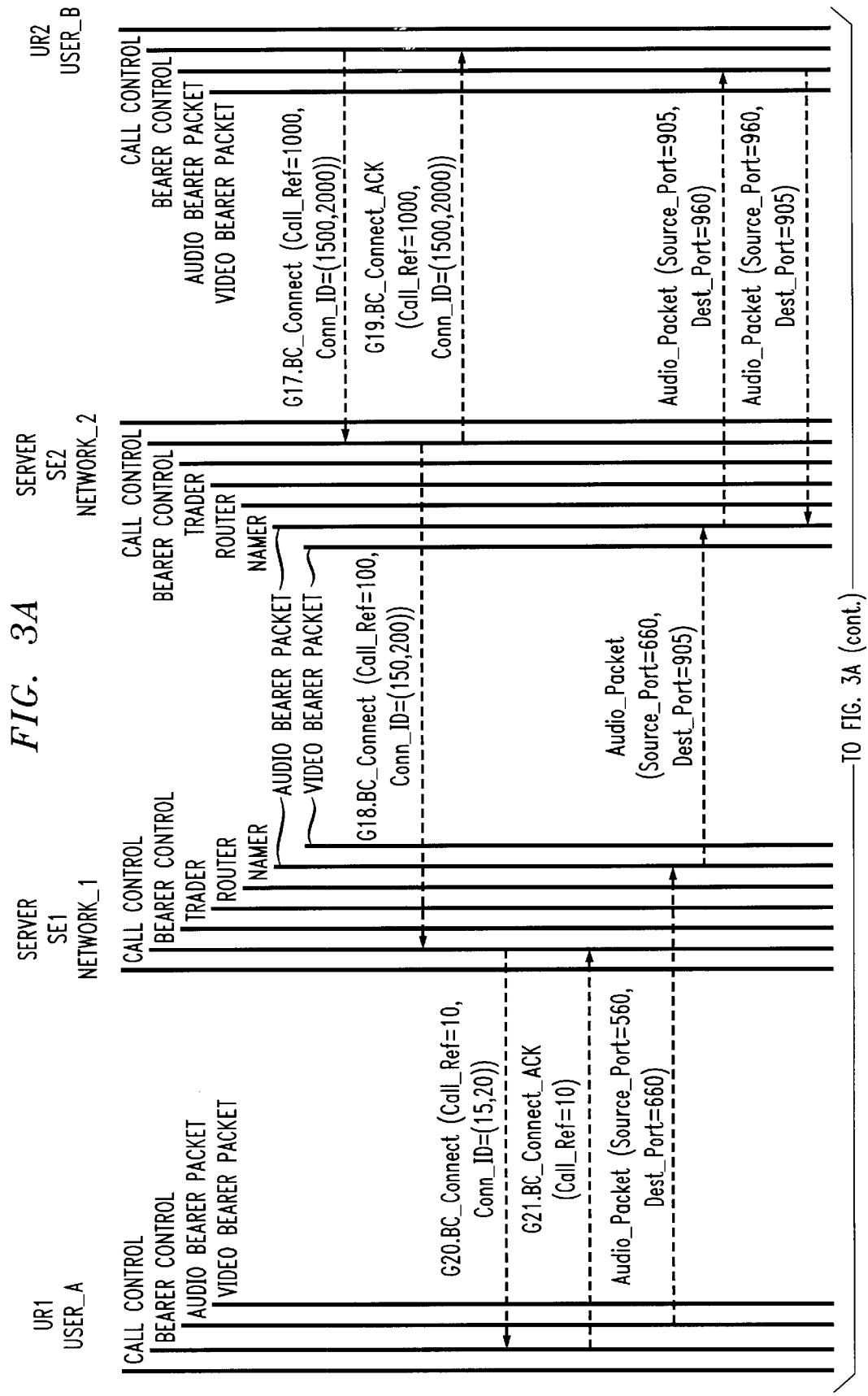

METHODS AND MEANS FOR MANAGING MULTIMEDIA CALL FLOW

RELATED APPLICATIONS

This application is a continuation to copending application of Hassan Hagirahim, Ser. No. 08/822,125, filed Mar. 21, 1997.

FIELD OF THE INVENTION

This invention relates to managing call flows between environments having different signaling protocols, and particularly between an asynchronous transfer mode (ATM) environment and a local area network (LAN) environment. The invention is based on using the ATM broadband integrated services digital networks (BISDN) signaling protocol for establishing multimedia calls for the multimedia terminals in the local area network. The invention is particularly directed to multi-media communication exchange (MMCX) call flows using BISDN signaling in LANs.

BACKGROUND OF THE INVENTION

In a LAN environment, applications on two different hosts communicate with each other by transmitting messages containing their internet addresses and port number addresses. When one user wishes to send a message to another user, it requires sending the message on the internet address and the port number address of the second user. Similarly, if the second user wants to send messages to the first user, the second user needs to send the internet address and port number address of the first user. One way of establishing the call is to have the first user send its internet and port number addresses to the second user and similarly have the second user send its internet and port number addresses to the first user.

In ATM signaling protocols, and particularly to BISDN signaling protocols, there are two distinct information elements (IEs) to be considered. The first IE in the virtual channel identifier (VCI) which is used to assign the virtual channels. The second IEs are the directory number (DN) IEs for the calling and called parties, which differ from the VCIs.

Call flows for multi-media communication exchanges (MMCX) require an initialization process before any users place a call. Such initialization may begin when a user logs into a terminal. The initialization process at this stage means establishing two signaling channels between a client and a server. One of the signaling channels establishes the communication between a call control agent at the terminal endpoint and a call control at the server. The other signaling channel establishes communication between a bearer control at the client and server. The client should have the internet address of the server. If for any reason, the client does not have the server's internet address, it will broadcast a reverse address resolution protocol (RARP) message to the network in order to request the server's internet address. The server responds by transmitting the server's internet address. The client should also have access to the initial port numbers of itself and the server.

SUMMARY OF THE INVENTION

An embodiment of the invention involves identifying in the one signaling protocol that the call is going to the environment having the other signaling protocol, replacing a first signaling element of the one signaling protocol with the corresponding second signaling element of the second protocol, and completing the call on the basis of the first signaling protocol with the corresponding second signaling element of the second protocol.

Another embodiment involves signaling with an ATM or BISDN protocol to a LAN protocol block by sending port numbers in the VCI (virtual channel identifier) field of ATM signals and the internet addresses in the directory number for the calling and called parties.

The various features of novelty that characterize the invention are pointed out in the claims. Objects and advantages of the invention will become evident from the following detail description in read in light of the accompanying drawings.

DETAILED DESCRIPTION OF PREFERRED EMBODIMENTS

Figure 1:
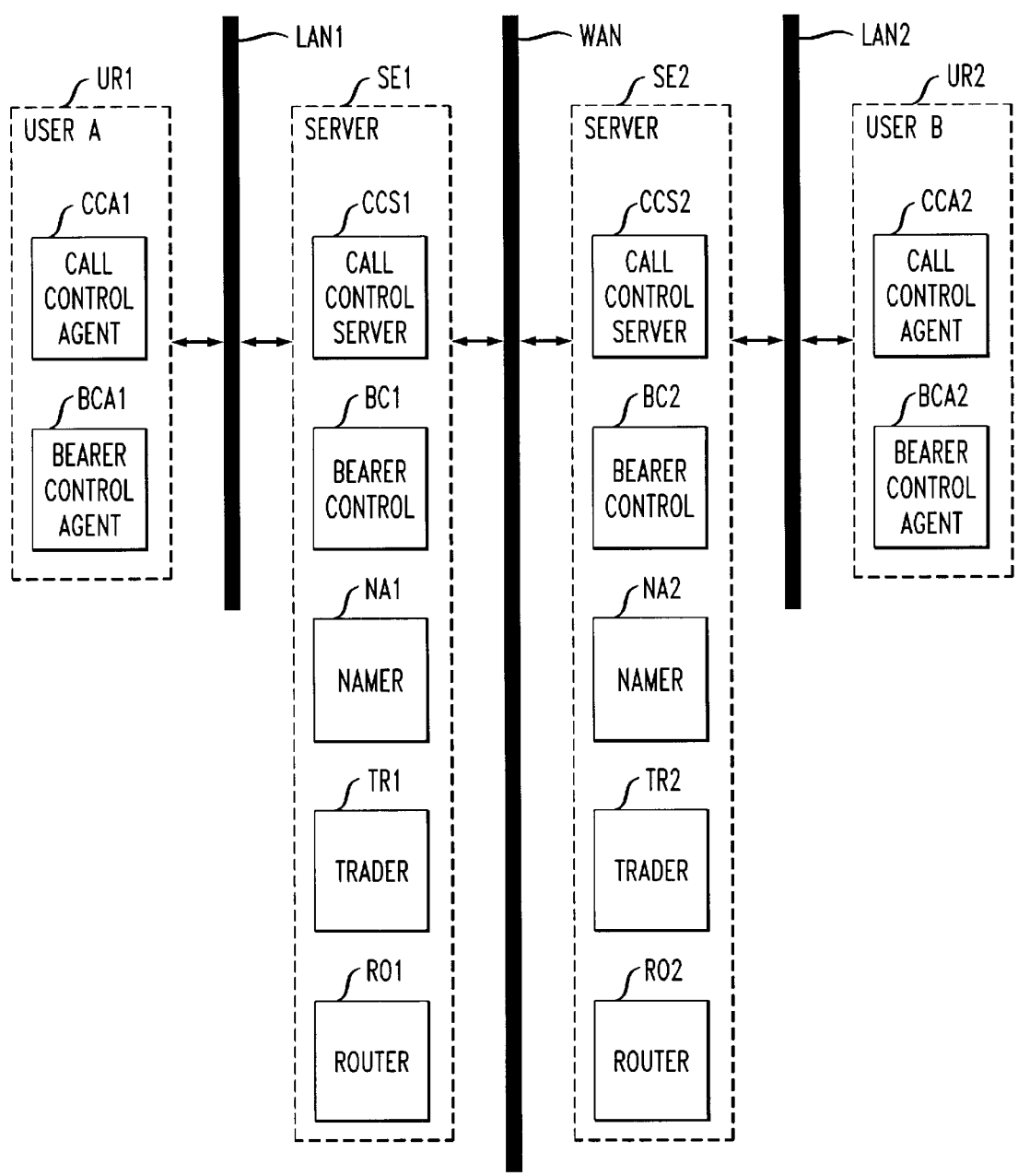
FIG. 1 is block diagram of a system containing an embodiment of the invention.

In FIG. 1, a local area network (LAN) LAN1 connects a user (user A) UR1 to a server SE1. A wide area network (WAN) WAN1 connects the server SE1 to a server SE2 and a LAN LAN2 connects the server SE2 to user (B) UR2. The users UR1 and UR2 operate as clients with the servers SE1 and SE2. Network WAN1 operates as a Wide Area Network (WAN) which could be of any type. For example, it could be an ISDN (e.g., a narrow bend Integrated Services Digital Network), a BISDN (e.g., Broad band Integrated Services Digital Network), a Frame Relay, etc.

Users UR1 and UR2 each include respective call control agents CCA1 and CCA2 as well as bearer control agents BCA1 and BCA2 for bearer elements, e.g., audio bearer, video bearer, and data bearer elements. The servers SE1 and SE2 include respective call control servers CCS1 and CCS2, bearer controls BC1 and BC2, namers NA1 and NA2, traders TR1 and TR2 and routers RO1 and RO2. If the wide area network is ATM, the signaling protocol at SE1 and SE2 will be connected and easily mapped to the ATM protocol.

Figure 2:
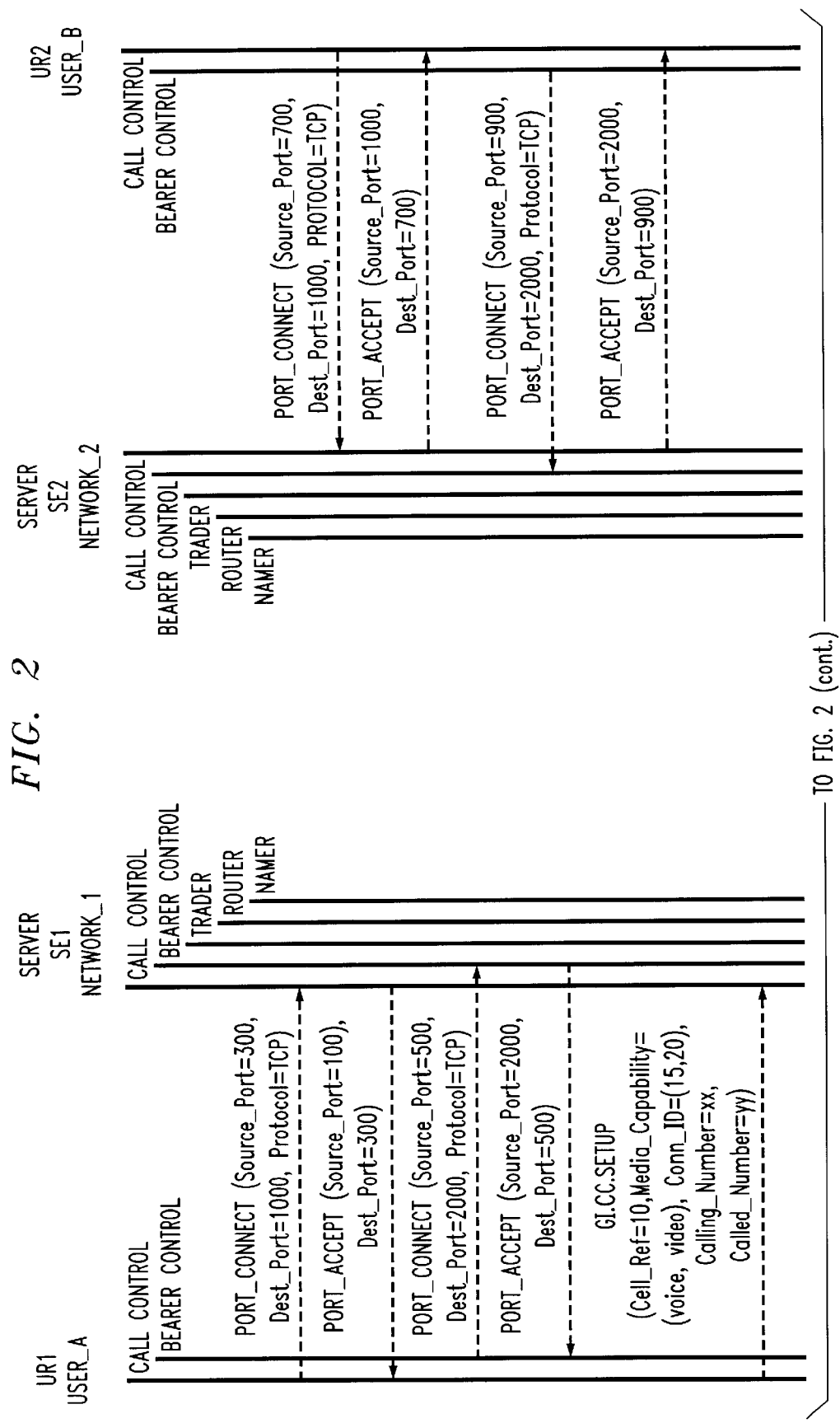
FIGS. 2, 2A, 3, and 3A are flow diagrams illustrating operation of the system in FIG. 1 with call flows in between two remote parties.

Since we are using the ATM signaling protocol from user UR1 to server SE1 and from user UR2 to server SE2, then the extent of the signaling messages will be kept intact. It would only be known that in the LAN environment the UCI's signaling BE fields are used to represent the port numbers and the BM fields are used to represent either the internet or call control addresses. But in the ATM WAN, the VCI's will represent the Virtual Channel Identifier as specified by the ATM protocol, and the DN signaling will represent the directory number either for calling or called parties as specified by E.164 addressing protocol. If the WASN is other than ATM, the signaling messages will travel through the wide area network transparently, meaning not to be converted to the WAN protocol. A connection through the WAN will be established between each pair of gateways (i.e., the servers SE1 and SE2) for only transferring the signaling messages between them. FIG. 2 is a step-by-step flow diagram illustrating the operation of the users and networks.

The system of FIG. 1 utilizes a signaling protocol that can be used in a multimedia call processor for establishing multimedia calls. The signaling is based on the separation of call control and bearer control. The call control signaling is similar to the CCITT Q.2964 protocol and the bearer control signaling is based on the Q.2931 which is being used for BISDN (broadband integrated services digital network) basic services. Examples of signaling messages refer to a video telephony scenario composed of two multimedia parties at two different locations. Each user is connected to a LAN. The server at each site acts as a gateway and also does the call processing. The interserver communication media between the two parties is based on accessing an ISDN (WAN). Thus, there is a channel established between server SE1 and server SE2, and as a result of the signaling protocols at SE1 and SE2 will transparently be carried over the pre-established channels without being terminated at server SE1 and server SE2.

The scenario entails the following steps:

User A places a call to B through its GUI (graphical user interface) or other available connection, selecting both voice and video.

User B goes off-hook, meaning that it accepts the call simultaneously with two media.

The call is established with two media.

The call flows and the signaling messages for the above scenario are shown in FIGS. 2, 2A, 3, and 3A.

Before users place any calls, they first need to be doing some kind of basic initialization with the call processor. As shown in the example of FIG. 2, users log in to their terminal to begin the initialization process. As a result, signaling messages will be transmitted to the server network SE1 or SE2 to establish two signaling channels between the client UR1 or UR2 and the server SE1 or SE2. One of the signaling channels carries the signaling messages between the call control agent CCA1 and call control server CCS1, and the other will be used to carry the bearer signaling messages between the client and the server. In this form, the client UR1 or UR2 sends a PORT CONNECT message to the server SE1 or SE2 to indicate that the client UR1 or UR2 needs to establish a TCP/IP (transmission control protocol/internet protocol) link with the server SE1 or SE2. The PORT CONNECT message is composed of the Internet and the Port Number addresses of the client and the server. The client should have the internet address of the server. If, for any reason, the client does not have the server's internet address, it will broadcast a Reverse Address Resolution Protocol (RARP) message to the network in order to request for the server's internet address.

The server, upon the reception of the RARP message, responds to the client by giving it the server's internet address. The client UR1 or UR2 should also have access to the initial port numbers to itself and the server SE1 or SE2. In general, the port numbers are used to define the communication channels between the Kernel and the TCP/IP or UDP/If communication processes. For a call at user UR1, at least two port numbers are reserved in order to allow the clients to establish their initial signaling associations between the call control agent CCA1 and call control server CCS1, and between the bearer control agent BCA1 at the client UR1 and the bearer control BC1 at the server SE1. Similarly, or a call at UR2, at least two port numbers should be reserved in order to allow the clients to establish their initial signaling associations between the call control agent CCA2 and call control server CCS2, and between the bearer control agent BCA2 at the client UR2 and the bearer control agent BC2 at the server SE2. For example, port numbers 1000 and 2000 have been arbitrarily selected as the global call processing port numbers for the call control and bearer control signaling, respectively.

The server SE1 or SE2, upon receiving a Port Connect message, creates a new TCP/IP communication process for the given client, assigns a new port number for the client, to which the future signaling messages will be sent, and transmits an ACCEPT message to the client. For a call at user UR1, this reserves two port numbers in order to allow the clients to establish their initial signaling associations between the call control agent CA1 and call control server CCS1, and between the bearer control agent BCA1 at the client UR1 and the bearer control BC1 at the server SE1. Similarly, for a call at UR2, two port numbers are reserved in order to allow the clients to establish their initial signaling associations between the call control agent CCA2 and call control server CS2, and between the bearer control agent BCA2 at the client UR2 and the bearer control BC2 at the server SE2.

The server assigns the port number by sending a query to the port manager requesting a pair of TCP port numbers to be assigned to the call control and bearer control to either user A or user B.

The ACCEPT message contains the internet and port number addresses of the client and server. As an example, we arbitrarily assign following port numbers (although any numbers may be used):

User__A Source Port number for Call Control=300
User__A Destination Port Number for Call Control=400
User__A Source Port Number for Bearer Control=500
User__A Destination Port Number for Bearer Control=600
User__B Source Port Number for Call Control=700
User__B Destination Port Number for Call Control=800
User__B Source Port Number for Bearer Control=900
User__B Destination Port Number for Bearer Control=950

Now, four TCP/IP communication links established between the call control agent and call control server and between the client bearer control and the server bearer control for Users A and B.

The above TCP/IP signaling channel establishment is similar to that of the Meta Signaling power up procedure used in Broadband ISDN. In BISDN, when a terminal powers up, it transmits a Meta__Signaling message on a global Signaling VCI to the network. The network, in response to the Meta_Signaling message, will transfer a Meta_ACK message to the terminal containing the assigned signaling VCI with which the client will be sending all of its signaling messages.

Also, the concept of port numbers is similar to that of the VCI in BISDN.

User A now places a call to User B through its GUI (graphical user interface) or other selection process, and selects both voice and video.

The signaling protocol to be used is based on the separation of call control and bearer control. The call control has the following functions:

It defines the call in a high level abstract model

It performs the compatibility checking of the end points.

It carries out the generic negotiation.

The bearer control is used in order to set up the physical bearer channels. This may also be referred to as the Virtual Transport. The bearer control signaling protocol is used to establish the basic call set up procedure which is based on the Q.2931 protocol.

The above scenario describes a video-telephony call that is being made by User_A to User B. At the beginning, the call control messages will be transmitted. It should be noted that the call control messages will not set up any physical bearer channels in the network.

User A transmits a call control setup message, CC_SETUP, to the server at G1 in FIG. 2. This message will be transmitted from User_A's call control agent CA1 to the call control at the server CCS1, and therefore it will be transmitted on the source port number 300 and destination port number 400, as described above. It will have the following information elements (IEs):

1. A Call_Reference IE: This is used in order to register the identity of the call.
2. Two Media Capability IEs: Each IE defines the media capability of each connection. It describes the attributes such as the types of media (e.g., voice, video, or data) and the types of encoding (e.g., H.261 if video, G.711 if voice, etc.).
3. Two Conn_ID: each IE registers the identity of each connection within the call.
4. Call_Control_Calling_Number: this is the call control directory number of the calling party, which can be based on the E.164 addressing, e.g., the current telephoning addressing.
5. Call_Control_Called_Number: this is the call control directory number of the called party, which as described above, can be based on the E.164 addressing.

The server SE1, upon the receipt of the CC-SETUP message, creates a call control object or process and adds the following members to it: (1) calling party, (2) called party, (3) voice media, (4) video media, (5) a naming server or namer, (6) a trading server or trader, and (7) a router.

The call control server CCS1 queries the namer NA1 server database in order to obtain the profiles of the calling and called parties. This operation will be performed by means of transferring a GET_PROFILE message to the namer NA1 server containing the calling and called parties call control numbers as shown at G2.

The namer NA1 or namer server finds only the profile of the calling party. It transfers the calling party's profile to the call control at the server CS1 at G3. Another set of information which can be derived from the user profiles are the bearer addresses of the calling and called parties. They serve to set up the bearer channels for the system under consideration, the bearer addresses are based on the internet addresses.

If the call control server CS1 had received the profile of the called party as well as the calling's, by means of comparing the profiles of the two parties to that which was specified by the bearer capability IE, it could have easily performed the compatibility checks for the two end equipment. However, since it does not have the profile of the called party, it needs to search for it. Thus, at G4, the call control server CS1 queries the database of the router RO1 in order to find out whether the called party resides locally or that it needs to find it by means of going through the WAN. Thus, the message that the call control server CS1 will transmit to the Routing server contains the called party's call control address.

The Router RO1 responds at G5 to the call control server CS1 by transferring a ROUTING_INFO message containing the routing information. In this example, the routing information will give an indication to the server that the called party does not reside locally and that the call control has to go through the WAN in order to find User B.

The call control server CS1 at G6 transmits a LOOK_AHEAD message to User_B's call control server CS2 (e.g., the terminating server). This message contains a Call_Ref IE, two Bearer Capability IEs, two Conn_ID IEs, and the called and calling call control addresses. It should be noted that this message, as its name implies, is sent in order to do the compatibility checking of the two end points. Thus, at this stage, no bearer channels will be established through the WAN. The server SE2, upon receiving the LOOK_AHEAD message, creates a call control (referred here to it as the terminating call control) and adds the appropriate members into it, e.g., the calling member, a called member, voice media member, video media member, namer, trader, and the router.

Figure 2A:
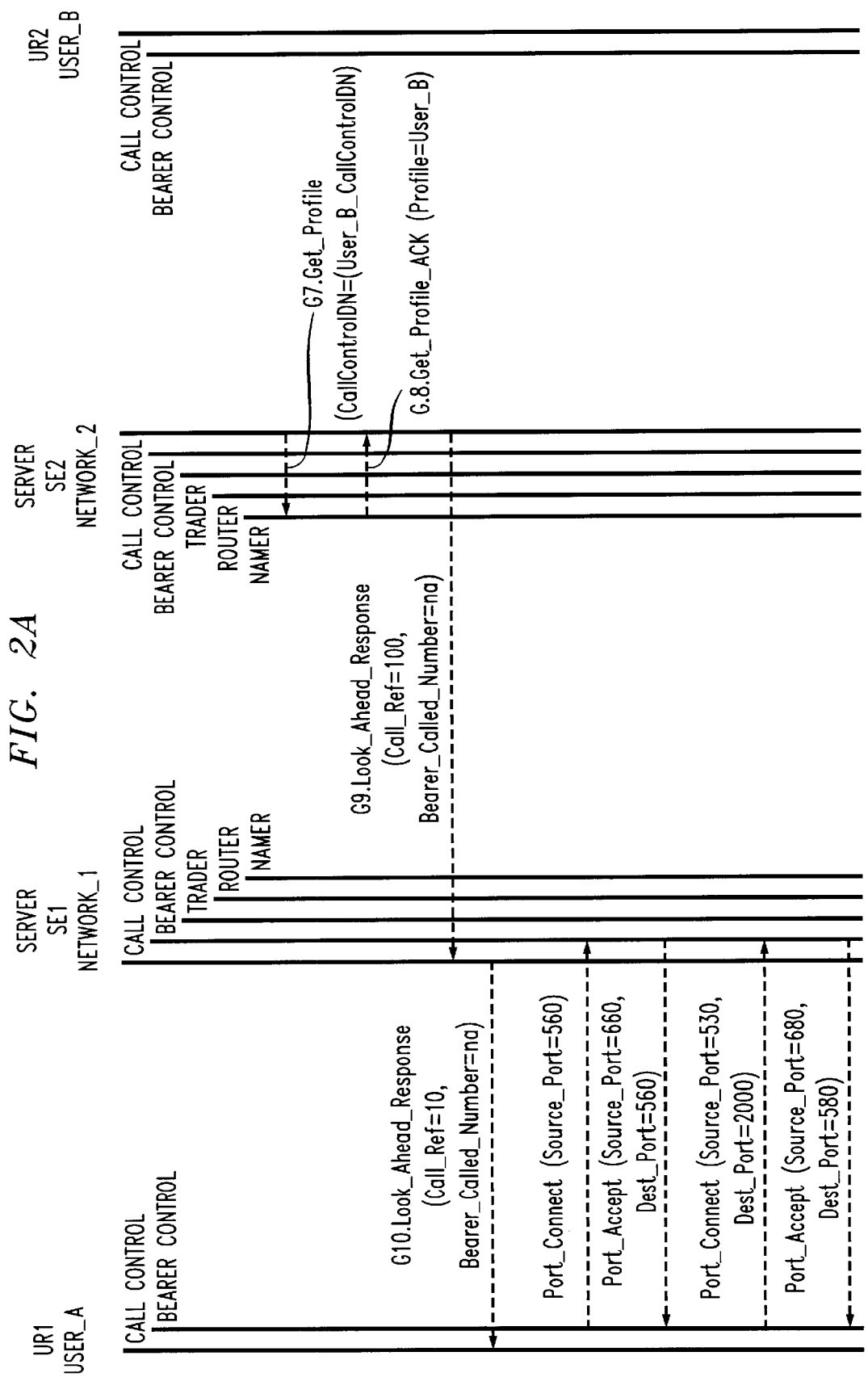

At G7, in FIG. 2A, the terminating context server CS2 queries the database of the namer NA2 in order to obtain the profile of the called party. This operation is carried out by transferring a GET_PROFILE message to the Namer NA2 containing the called party DN number (e.g., User_B'S call control address).

At G8 the namer NA1 finds the profile of the called party and transfers it to the terminating call control server CS2.

The terminating call control server CS2, by comparing the bearer capability IE with the corresponding IE in the called party's profile, carries out the compatibility checking of the two end points. If the two endpoints are compatible. The call control server CS2 will respond at G9 by transmitting a LOOK_AHEAD_RESPONSE message to the originating call control server CS1. This message will contain the Call_Ref IE and the called party bearer address. The called party bearer address is extracted from the called party's user profile. In this example, since the called party is connected to a standard local area network of type IEEE 802.3 (e.g., an Ethernet), the called party's bearer address will be based on the internet address of the called party.

When the call control server CS1 at the originating server SE1 receives the LOOK_AHEAD_RESPONSE message, it will transfer the same type of message to the call control agent CCA1 of the User A at G10.

User_A is notified that the two end points are compatible with each other. This means that the call control process has now been successfully completed and that User_A's terminal will now be able to initiate the transmission of the bearer messages. But before the start of transmitting any bearer message, two logical bearer channels (one for voice and the other for video) have to be established between User_A and the gateway (e.g., the server). Thus, the User_A's bearer control agent BCA1 now creates two new UDP processes and assigns a new port number to each of them, (e.g., 560 and 580 for voice and video bearer streams, respectively or any other convenient numbers). It should be noted that User_A will assign the port numbers by sending requests to the port manager. Next, the User_A's bearer control agent BCA1 transmits two PORT_CONNECT messages to the server SE1 bearer control BC1 on port number 2000. Each message contains a protocol ID information element which in this case will be UDP. The server BC1, after creating two new UDP processes and assigning a new port number to each of them (e.g., 660 and 680 for voice and video streams, respectively), sets up the two bearer channels, and transmits two PORT_ACCEPT messages to User_A's bearer control agent BCA1.

Figure 3:
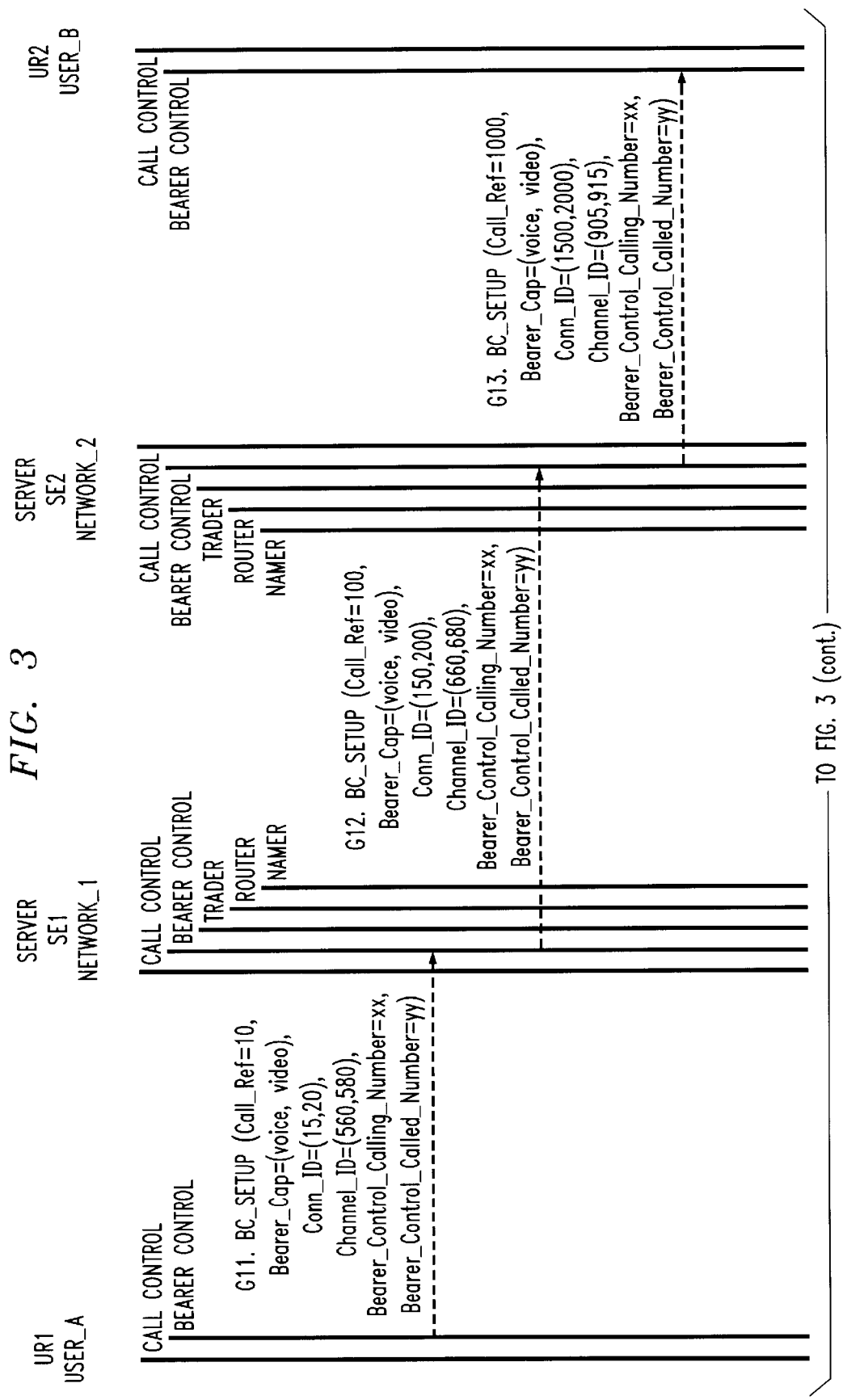
Figure 3:
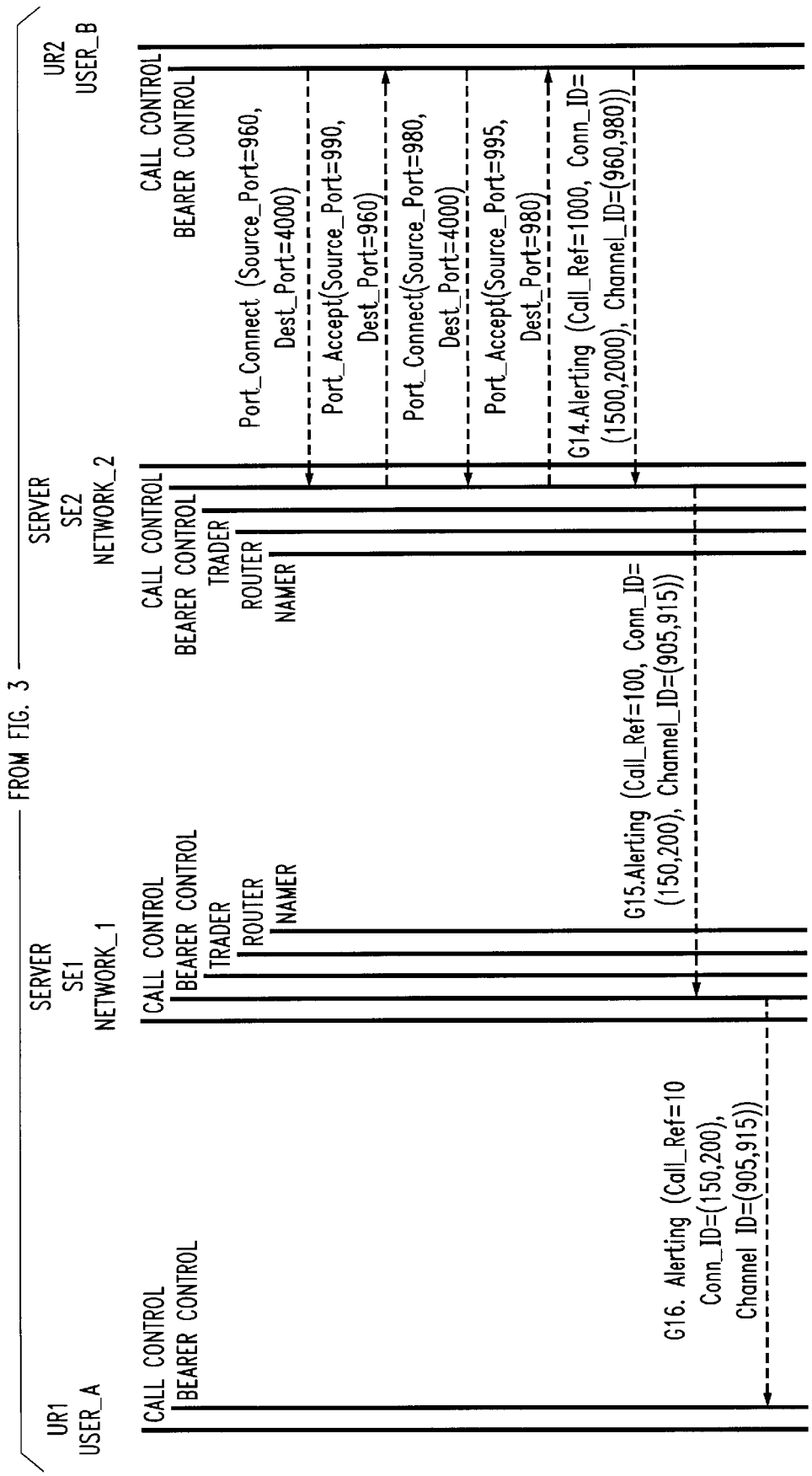

At G11 in FIG. 3, User_A's bearer control agent BCA1 now transmits a BC_SETUP message to the network SE1. The message contains the following IEs:

Call_Ref as described above.

Two bearer capability IEs, as one of them is used for the voice connection and the other for video connection.

Two Connection Reference IEs, as one of them is used to register the voice connection and the other is used to register the video connection.

Two Channel_ID IE which are the source port number addresses of User_A's voice and video UDP bearer streams. In this example, these are set at 560 and 580. It should be noted that if the end points were BISDN terminals, the Channel_IDs would have been defined in terms of VCIs than the TCP/UDP port numbers.

Calling_Number IE which is the bearer address of the calling party, and in this example it is based on the internet address of the calling party.

Called_Number IE which is the bearer address of the called party, and in this example it is based on the internet address of the called party.

The message is transmitted on the TCP/IP connection that was established for the bearer connection between the calling party A and the server SE1, e.g., it is carried on the source port and destination port of 500 and 600, respectively.

The server SE1, upon the reception of the BC_SETUP message, determines the bearer route in which it should take via the WAN in order to reach User_B. At G12 it then transmits a BC_SETUP message to the terminating server SE2. This message contains the IEs of G11, with the exception that the connection IDs are 150, 200 instead of 15, 20 and the Channel_IDs are 660, 680 instead of 580 and 580.

At G13, the terminating server SE2, upon the reception of the BC_SETUP message, determines the location of the called party and then transmits a similar BC_SETUP message to it. However, prior to the transmission of the BC_Setup, it creates two new UDP processes and assigns port number addresses of 905 and 915 to them, respectively. The BC_Setup message is then transmitted to User B having Channel_IDs of 905 and 915 for audio and video UDP bearer streams, respectively.

User_B's terminal, upon receiving the BC_SETUP message, extracts the source and destination port number addresses as being the UDP Port number bearer addresses of audio and video streams for the given call at server SE2, which it will use later to transmit the voice and video packets. It then creates two new UDP bearer processes for the voice and video and assigns a new source port number to each of them, e.g., 960 and 980 for voice and video, respectively. It should be noted that User_B will obtain these UDP Port numbers by means of sending requests to the Port_Manager. It transmits two PORT_CONNECT messages to the bearer control BC2 of the terminating server SE2 in order to set up the voice and video bearer streams. The server SE2, after receiving each Port_CONNECT message, sets up the corresponding bearer channels and transmits a Port_ACCEPT message to the client's bearer control agent BCA2 in order to acknowledge the bearer set up operation. On the other hand, the terminating server's bearer control BC2 does not connect the bearer to the WAN. It leaves these as the only open connections until it receives a BC_CONNECT message from User_B.

The BC_SETUP message alerts User B. As a result, User_B's bearer control agent BCA2, upon the reception of the BC_SETUP message, transmits an ALERT message to the bearer control BC2 of server SE2 via the WAN at G14, which in turn transmits an ALERT message to the bearer control BC2 at G15. The message at G14 contains a Call_Ref IE, two Conn_Id IEs indicating that the two requested connections are alerting, and the two Channel_ID numbers corresponds to the UDP server Port number addresses for the voice and video bearer streams of User B.

The message at G16 contains the similar field with the two Channel_ID corresponding to the UDP port number to the audio and video streams at server SE2.

Figure 3A:
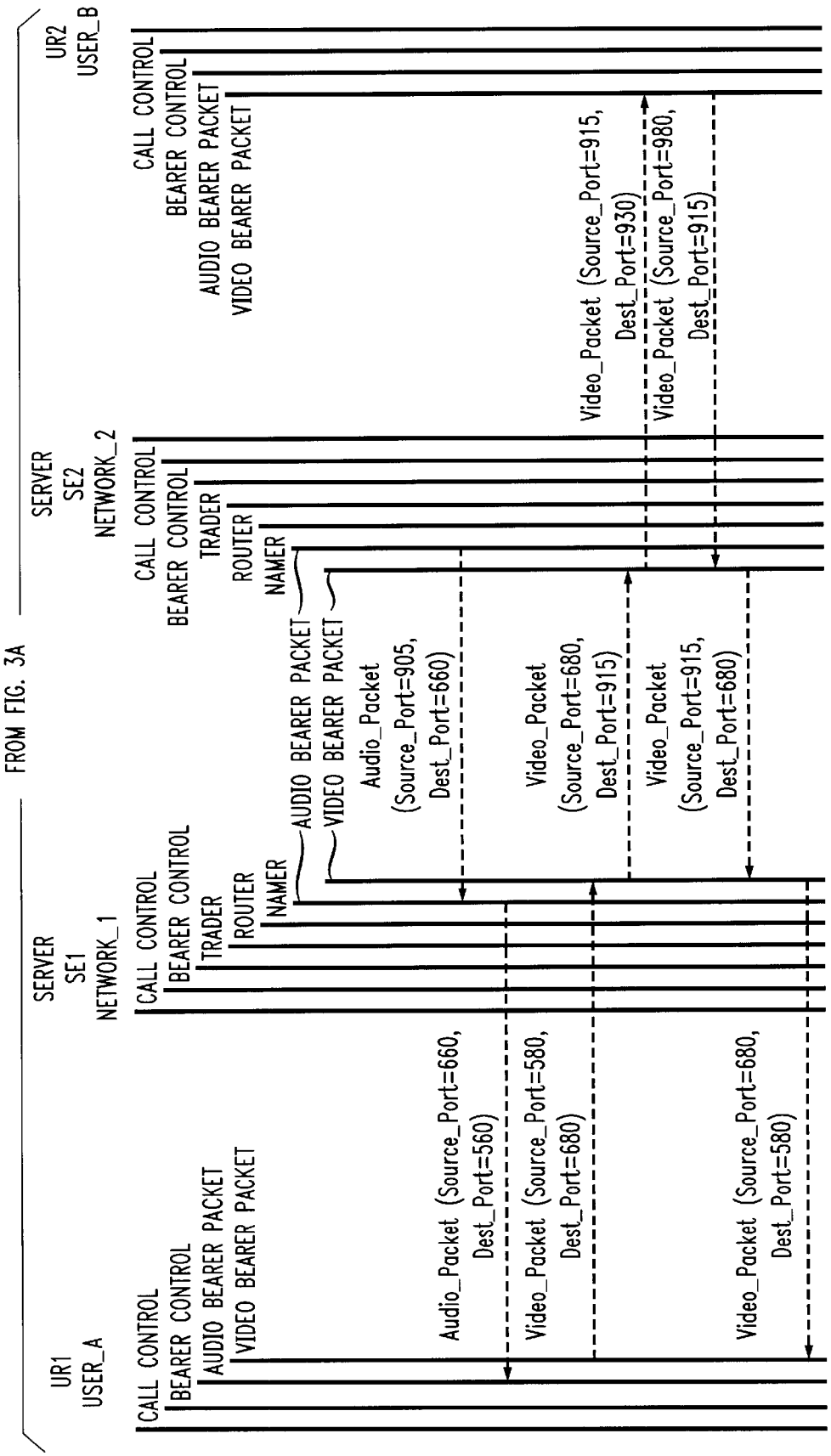

In FIG. 3A, the originating server SE1, upon the reception of the ALERT message at G17, transmits a similar ALERT message to the bearer control agent BCA1 of User A at G16, indicating that the called party is alerting.

This message will carry the source port number addresses of server SE1 in Channel_ID IE, indicating that the User_A will have to send the audio and video bearer packets to server SE1.

The calling party, user A, upon the reception of the ALERT message, extracts the source port number of server SE1 voice and video streams and will now have all the destination bearer addresses in order to send all the voice and video bearer packets.

The called party, user B, now goes off-hook, indicating that it has accepted the call simultaneously with the two requested connection. In this form, at G17, it sends a BC_CONNECT message to the terminating server containing a Call_Ref IE and the two Conn_ID, which each Conn_ID representing the acceptance of a particular connection which has been associated with the connection.

The terminating server SE2, upon the reception of the BC_CONNECT message, establishes the connections of the bearer channels with the WAN and, at G18, transmits a BC_CONNECT message from the bearer control agent BCA1 to the bearer control BC1 of the originating server SE1. At G19, the terminating server SE2 sends a BC_CONNECT_ACK message to the bearer control BC2 of the server SE2 of the called party.

At G20, the originating server SE1, upon the reception of the BC_CONNECT message from the terminating server, transmits a similar BC_CONNECT message to the calling party.

At G21, the calling party, user UR1, responds by transferring a BC_CONNECT_ACK message to the originating server SE1.

After the call establishment, the audio and video packets from USER_A and USER_B are transmitted according to the steps following G21. If the transmission is from User_A to User_B, each packet will be routed carrying the internet address of server SE1 and the destination UDP port number address of server SE1 which it had just received for the given media, e.g., for audio the Source_Port is 560 and destination port is 660. The server SE1 will terminate the LAN protocol and construct a new audio packet which will comply with the WAN protocol and then it transfers it to the server SE2. The header of the packet will contain all the routing information which will indicate that the Source_Port number is 660 (e.g., the server SE1 audio port number) and the destination Port number is 905 (e.g., the server SE2 audio port number). The server SE2, upon receiving the audio packet, will terminate its WAN protocol and constructs a new packet which will be according to the LAN protocol of the types exists in User_B's environment. Thus, the audio packet will consist of having the bearer internet address of User_B and having the source and destination UDP port numbers of 905 and 960, respectively.

If the transmission is from User_B to User_A, each packet from User_B will be routed carrying the internet address of server SE2 and the given source and destination UDP port number addresses of 960 and 905, respectively. Similarly server SE2 will terminate the LAN protocol and then constructs a new audio packet having the source and destination port numbers of 905 and 660, respectively, and then transfers the packet to server SE1. The server SE1 will then terminate the LAN protocol and will construct a new audio packet complying to the LAN protocol of type in server SE1 environment and transfers it to User_A having the source and destination port number addresses of 660 and 560, respectively.

Figure 4:
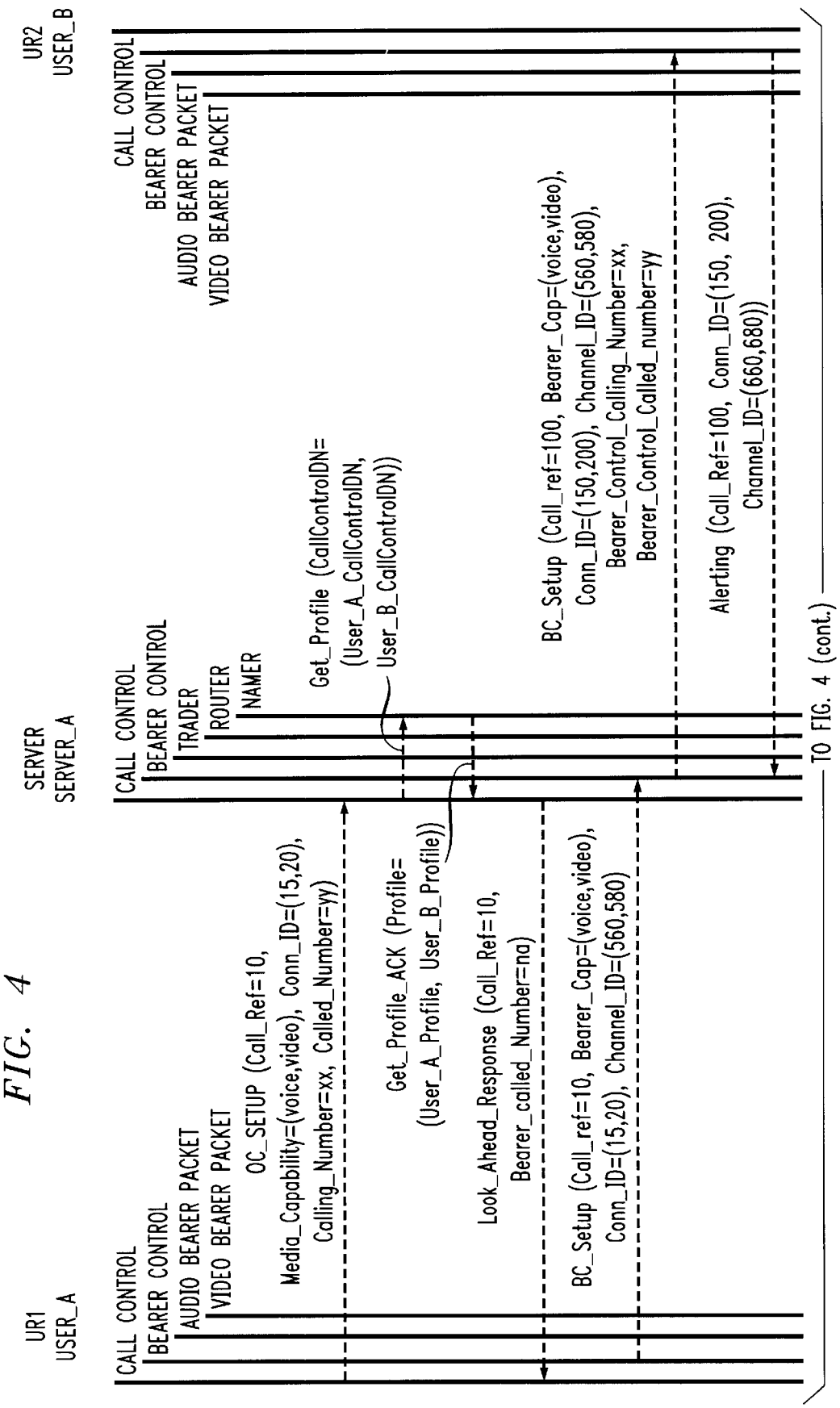
FIG. 4 is a flow diagram illustrating operation for instituting a local call in which both parties reside in the same LAN.
Figure 4:
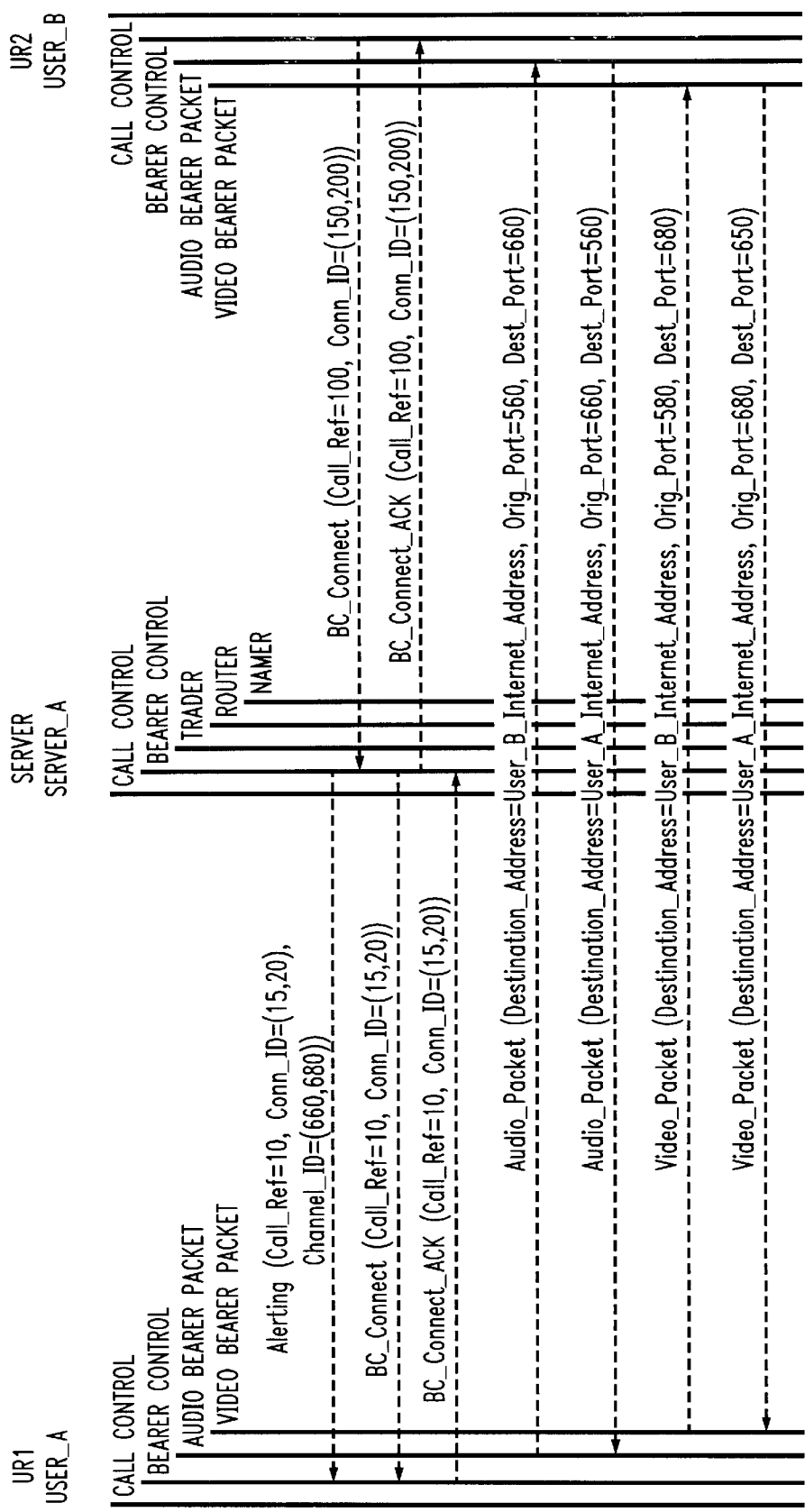

The aforementioned scenario establishes multimedia calls involving inter-server communication through a WAN. FIG. 4 illustrates a similar arrangement for instituting a local call in which both parties reside in the same LAN. Here, user A and user B employ the same power up procedure as for a WAN to register themselves with server A and also to create TCP signaling channels with the server. In the case of a local call the signaling procedure for call initiation is considerably simpler than for wide area networks because the server does not have to terminate the LAN protocol and reconvert it again.

After establishment of the call, if the transmission is from user A to user B, each packet from user A is routed while carrying the internet address and port number address of user B. Correspondingly, if the transmission is form user B to user A, each packet from user B is routed while carrying the carrying the internet address and port number address of user A.

FIGS. 5 to 15 illustrate an embodiment of a signaling protocol together with a call model. The signaling protocol is based on using the BISDN signaling protocols (e.g., Q.2931, Q.2964, etc.). The call model is object oriented. The scenario presented below is for establishing a point-to-point local call, between two parties, having voice and video media.

The signaling protocol includes changes which are required to be made on the BISDN signaling protocol in order to make it usable in the LAN type of environment. In general, in the LAN environment, applications on two different hosts will communicate with each other by means of transmitting messages containing their internet addresses and the UDP (user datagram protocol) or TCP (transmission control protocol) port number addresses.

When User-A wishes to send any messages to User-B, it needs to send them on the internet address and the port number address of User-B. Similarly, if User-B wants to send any messages to User-A, it needs to send them on the internet address and the port number address of User-A. Thus, in this type of networking architecture, one way of implementing the call set up procedure is that during the call set up establishment, User-A should be sending its internet and port number addresses to User-B, and similarly, User-B should be sending its internet and port number addresses to User-A.

In the BISDN signaling protocol, the Virtual-Channel-Identifier information element is used to carry the selected VCI between the parties. This field can be used to carry the source port number address of a given party.

The directory number fields are used in the BISDN signaling protocol to transport the directory numbers of the calling and called parties. These fields can be used here to carry the internet addresses of the calling and called parties.

The call model of this embodiment is based on the object oriented operation. It includes the object of carrying all the information about the corresponding end point that it represents. It performs the functions of converting the external signaling to its internal counterpart, and visa versa, and finds the appropriate terminating routing objects.

Originating & Terminating Call Objects do the majority of call processing. Each has a state machine which has all the possible states for carrying out the basic call processing. For example, some of the possible states are Origination, Call Proceeding, Alerting, Answered, and Disconnect.

In a Point-to-Point Local Audio/Video Call, User A places a call to User B by selecting the voice and video media and pressing the "Place Call" button on its GUI), User B gets alerted, and User B answers the call.

Figure 5:
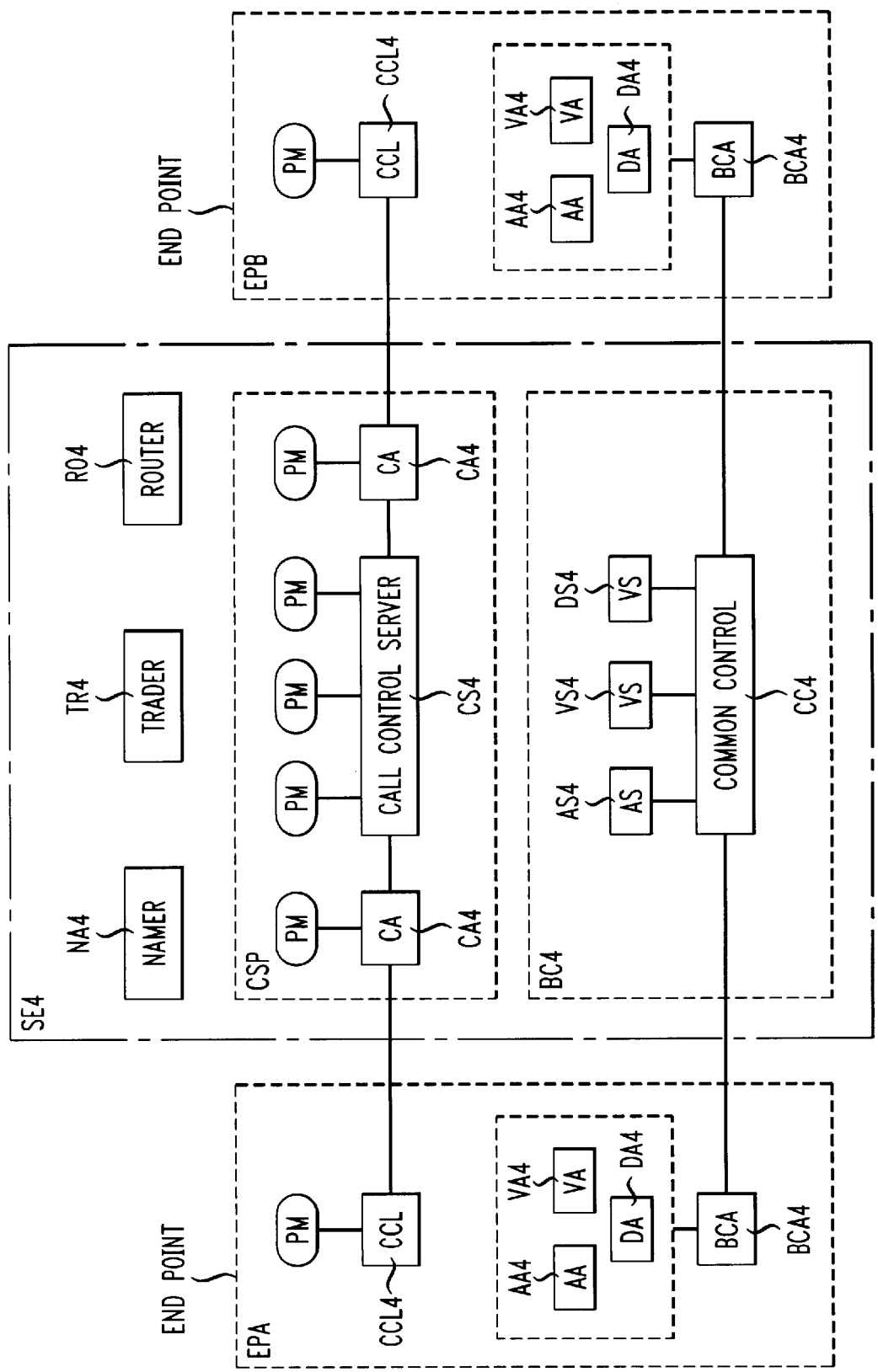
FIG. 5 is a block diagram illustrating the system architecture of another embodiment.

FIG. 5 illustrates the software architecture of a server and clients of this embodiment. Here, server SE4 includes a call control service portion CSP which provides call control services. The main function of the call control services is to ensure that prior to the establishment of a call end points EP will be compatible. Call control services reside at the end points and the server. At the end point, call control services are referred to as the call control client agent (CCL) CCL4. In the server SE4 call control services include a call control server CS4. Call control services in the server SE4 include policy modules PM each used to implement a particular property, a namer NA4, a trader TR4, and a router R04. The namer NA4 performs translation between the call control address and the bearer control address. The trader TR4 finds resources in the network (e.g., a conference bridge). The router R04 helps facilitate routing in the network. The server SE4 further includes call control agents CA4 as well as a bearer control BC4. In the latter, a common control CC4 uses an audio server AS4, a video server VS4, and a data server VD4.

The end points include call control client agents CCL4, bearer control agents BCA4, audio call control agents AA4, video call control agents VA4, data call control agents DA4, and policy modules.

Figure 6:
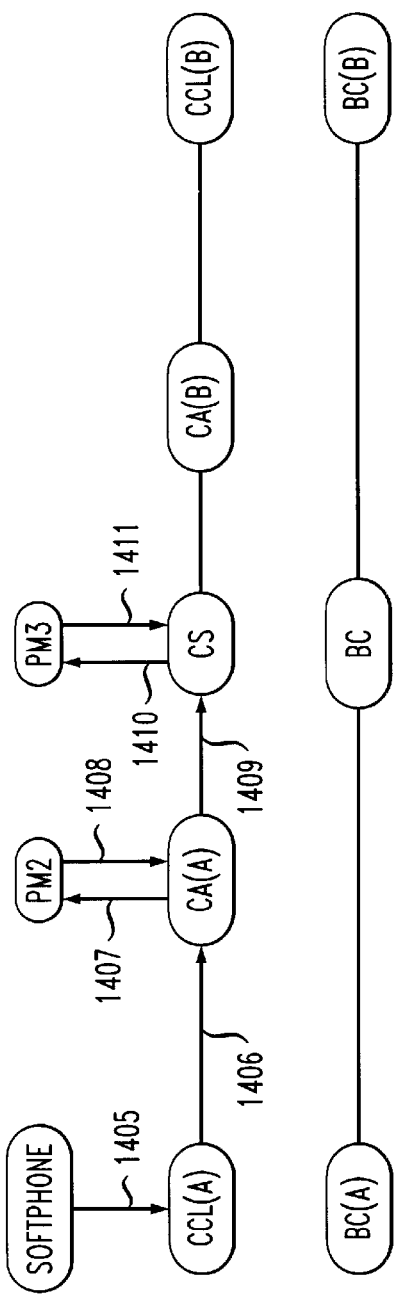
FIG. 6 is a flow diagram illustrating operation of FIG. 5.

FIG. 6 illustrates operations identified as 1405 to 1411 for a point to point audio/video call in the system of FIG. 5. The operations are as follows:

1405. CreateCallControlBegin( ) {i.e. Begin establishing call}.

1406. CallControl_Setup(Media=(voice,video), Calling call control addressing=xx, Called-CallControl Addressing=yy)

1407. CallControl_Setup( )

1408. OK

1409. CallControl_Setup( )

1410. CallControl_Setup( )

1411. OK

Figure 7:
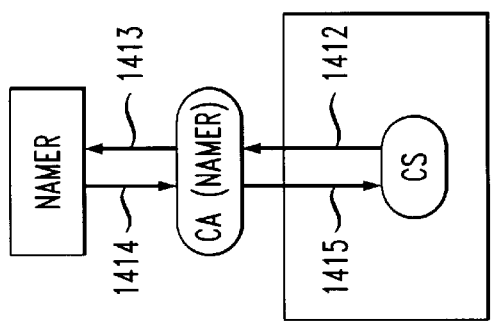
FIG. 7 is a further flow diagram illustrating operation of FIG. 5.

FIG. 7 illustrates further operations identified as 1412 to 1415 for the point to point audio/video call in the system of FIG. 5. The operations are as follows:

1412. Get_Profile(Call_Control_Address=(xx,yy))

1413. Get_Profile(Call_Control_Address=xx,yy))

1414. Get_ProfileACK(Profile=(A=64 kb/s, G.711, Audio_Bearer_Address=aa Video=128 kb/s, H.261, Video_Bearer_Address=bb)

1415=1414.

The user profile will contain the bearer addresses which in this scenario are the internet addresses. This means that it will give the necessary information to determine the host to which its addresses resided locally within the same network. Both hosts are in the same network. Thus, in this case, the call control server does not have to go to the router to get the routing information.

Figure 8:
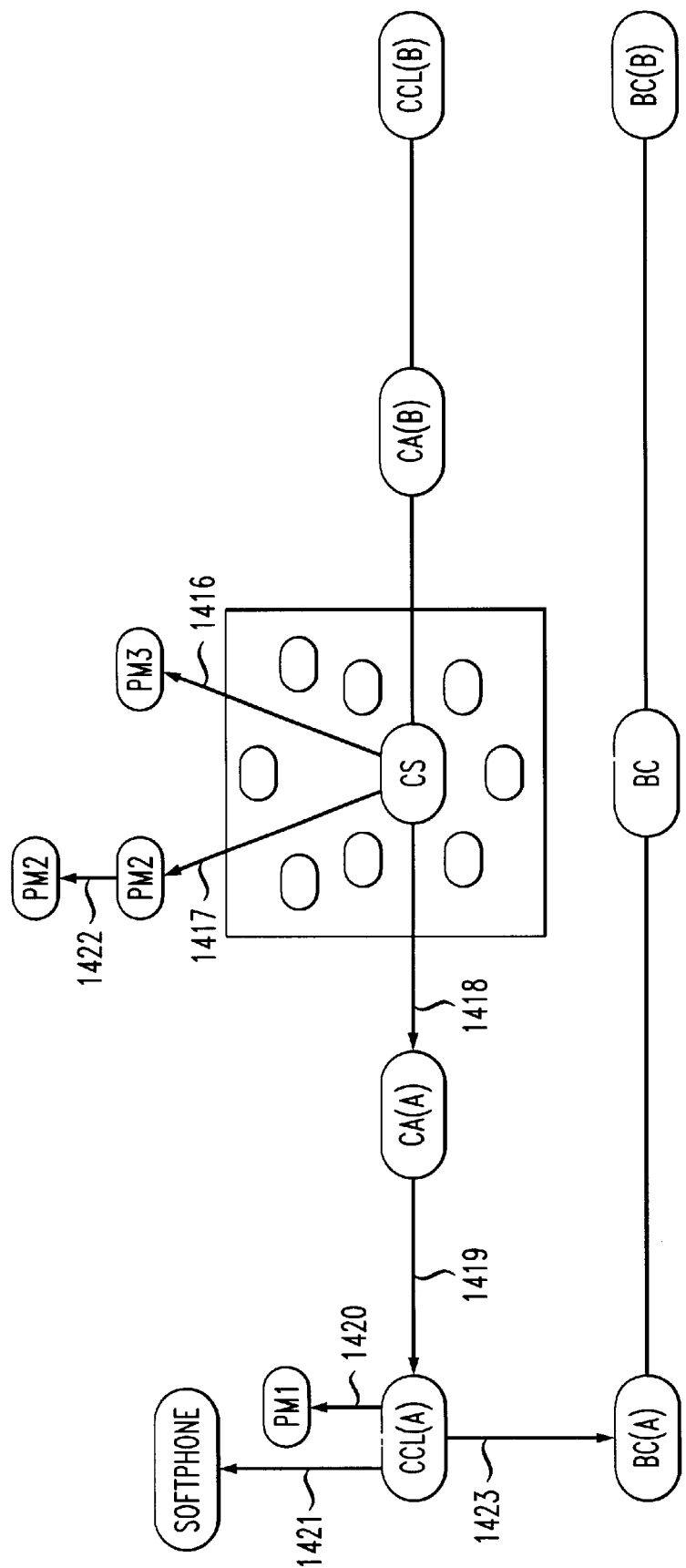
FIG. 8 is a further flow diagram illustrating operation of FIG. 5.

FIG. 8 illustrates further operations identified as 1416 to 1423 for the point to point audio/video call in the system of FIG. 5. The operations are as follows:

1416=1417=1418. CreateCallControl(END)

1423=1422=1421=1420=1419. LookAheadResponse(Call_Control_Address=(xx,yy), Bearer_Address=(aa,bb)

Here, aa and bb are selected to be the bearer addresses of User A and User B, respectively.

Figure 9:
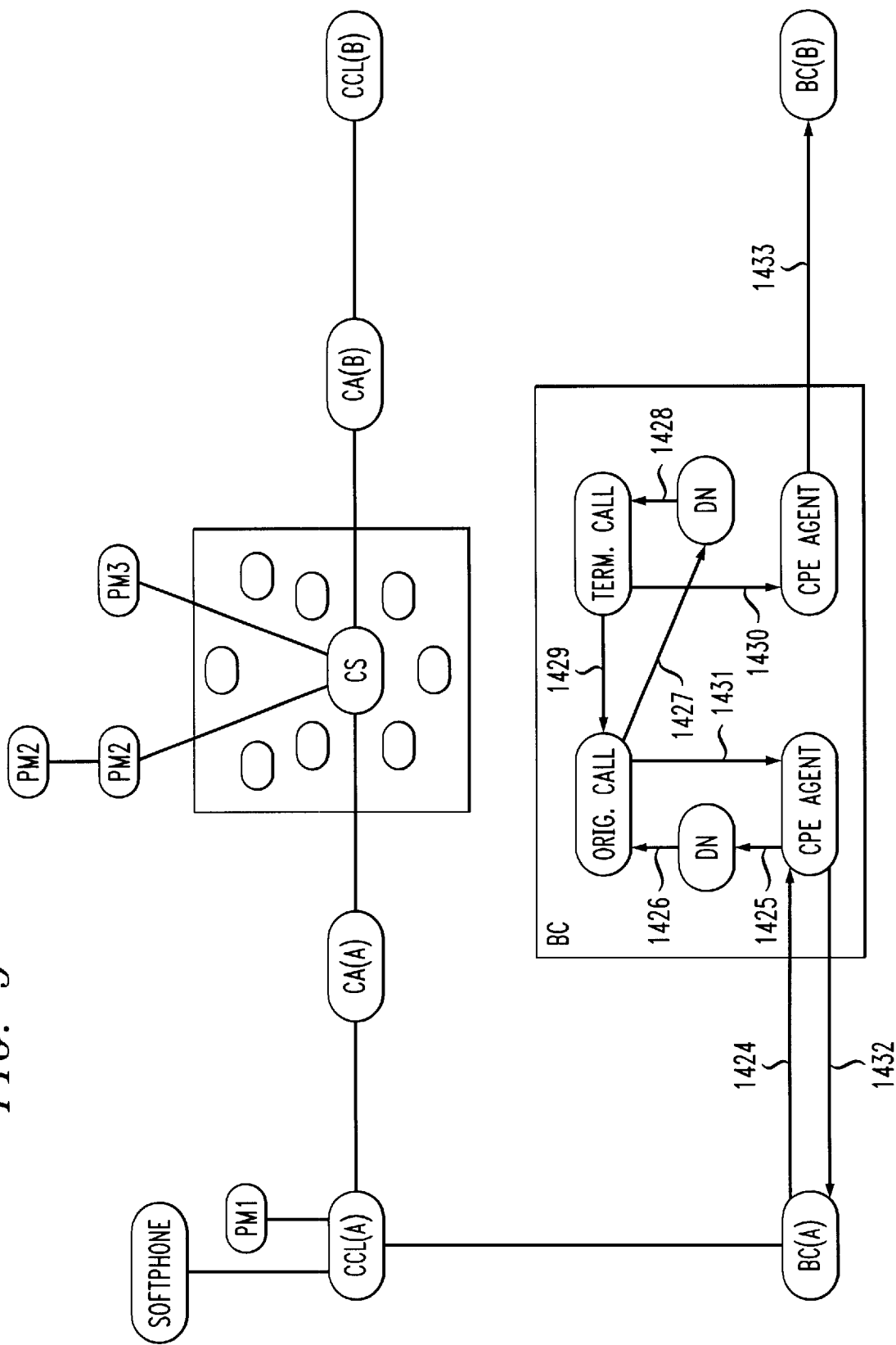
FIG. 9 is a further flow diagram illustrating operation of FIG. 5.

FIG. 9 illustrates further operations identified as 1424 to 1433 for the point to point audio/video call in the system of FIG. 5. The operations are as follows:

1424. BearerControl_Setup(Call_Ref=10 {i.e. for entire call}, Conn_ID=(15,20) {i.e. for connecting voice video}, Media=(voice,video) {i.e. to define media}, Channel_ID=Source port_number=(100,300) (i.e. create ports and assign port numbers}, Bearer Control Addressing for User_A (e.g., the calling party internet_address)=(aa), Bearer_Control addressing for User_B=(bb) {i.e. LAN}

1425. Call_info(Call Ref=10 {i.e. for entire call}, Conn_ID=(15,20) {i.e. for connecting voice video}, Media+(voice,video) {i.e. to define media}, Channel_ID=Source_port_number=(100,300) {i.e. create ports and assign port numbers}, Bearer Control Addressing for User_A (e.g., the calling party)—Internet address (aa), Bearer_Control addressing for User_B=(bb) {i.e. LAN}

1426. Create_Callobject(Call_Ref=10 {i.e. for entire call}, Conn_ID=(15,20) {i.e. for connecting voice video}, Media=(voice,video) {i.e. to define media}, Channel_ID=Source_port_number=(100,300) {i.e. create ports and assign port numbers}, Bearer Control Addressing for User_A (e.g., the calling party internet address)=(aa), Bearer_Control addressing for User_B=(bb) {i.e. LAN)

1427. Incoming_Call(Call_Ref=10 {i.e. for entire call}, Conn_ID=(15,20) {i.e. for connecting voice video}, Media+(voice,video) {i.e. to define media}, Channel_ID=Source_port_number=(100,300) {i.e. create ports and assign port numbers}, Bearer Control Addressing for User_A (e.g., the calling party internet address)=(aa), Bearer_Control addressing for User_B=(bb) {i.e. LAN}

1428. Create_Call_Object( )

1429. Call_Proceeding( )

1430. Incoming_Call( )

1431. Call_Proceeding( )

1432. Call_Proceeding(Call_Ref=10)

1433. Bearer Control_Setup(Call_Ref=1000, Conn_ID=(150,200),Media=(voice,video), Channel_ID= Dest_Port_Number=(100,3000), {i.e. same source LAN port numbers} Call Control Address=(xx,yy), Bearer_Address=(aa,bb))

Figure 10:
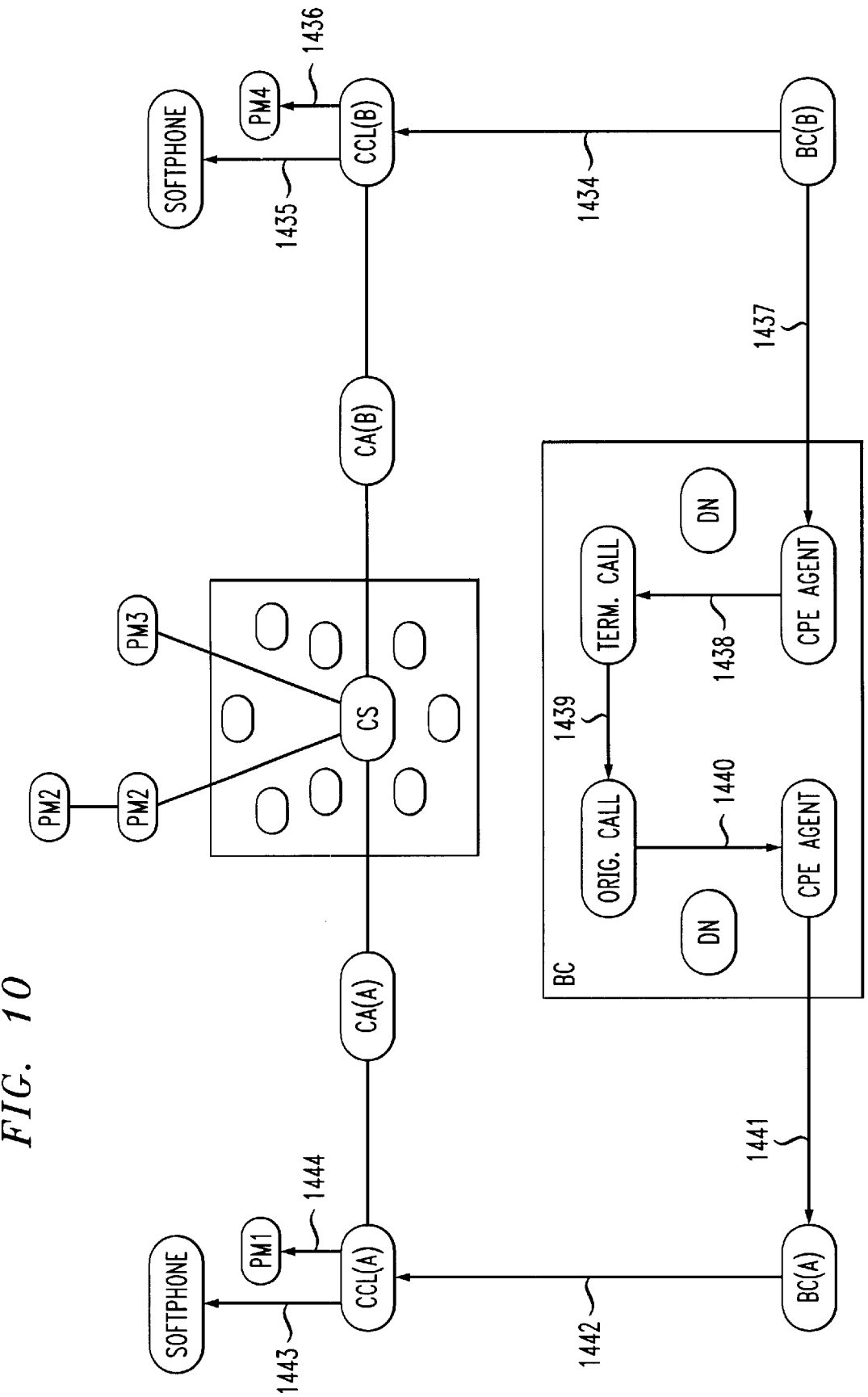
FIG. 10 is a further flow diagram illustrating operation of FIG. 5.

FIG. 10 illustrates further operations identified as 1434 to 1444 for the point to point audio/video call in the system of FIG. 5. The operations are as follows:

1434. Alert(Call_Ref=100,Conn_ID=(150,200),Media=(voice,video))

1435. Alert(Call_Ref=150,Conn_ID=(150,200),Media=(voice,video))

1436. Alert(Call_Ref=150,Conn_ID=(150,200),Media=(voice,video))

1437. Alert(Call_Ref=150,Conn_ID=(150,200), Channel_ID=Source_Port_Number(200,1400)) {i.e. creates port numbers}

1438. Alert( . . . )

1439. Alert( . . . )

1440. Alert( . . . )

1441. Alert(Call_Ref=15,Conn_ID=(15,20), Channel_ID=Source_Port-Number(200,400)) {i.e. receives port number from 37}

1442. Alert(Call_Ref=15,Conn_ID=(15,20), Media=(voice,video))

1443. Alert(Call_Ref=15,Conn_ID=(15,20), Media=(voice,video))

1444. Alert(Call_Ref=15,Conn_ID=(15,20), Media=(voice,video))

Figure 11:
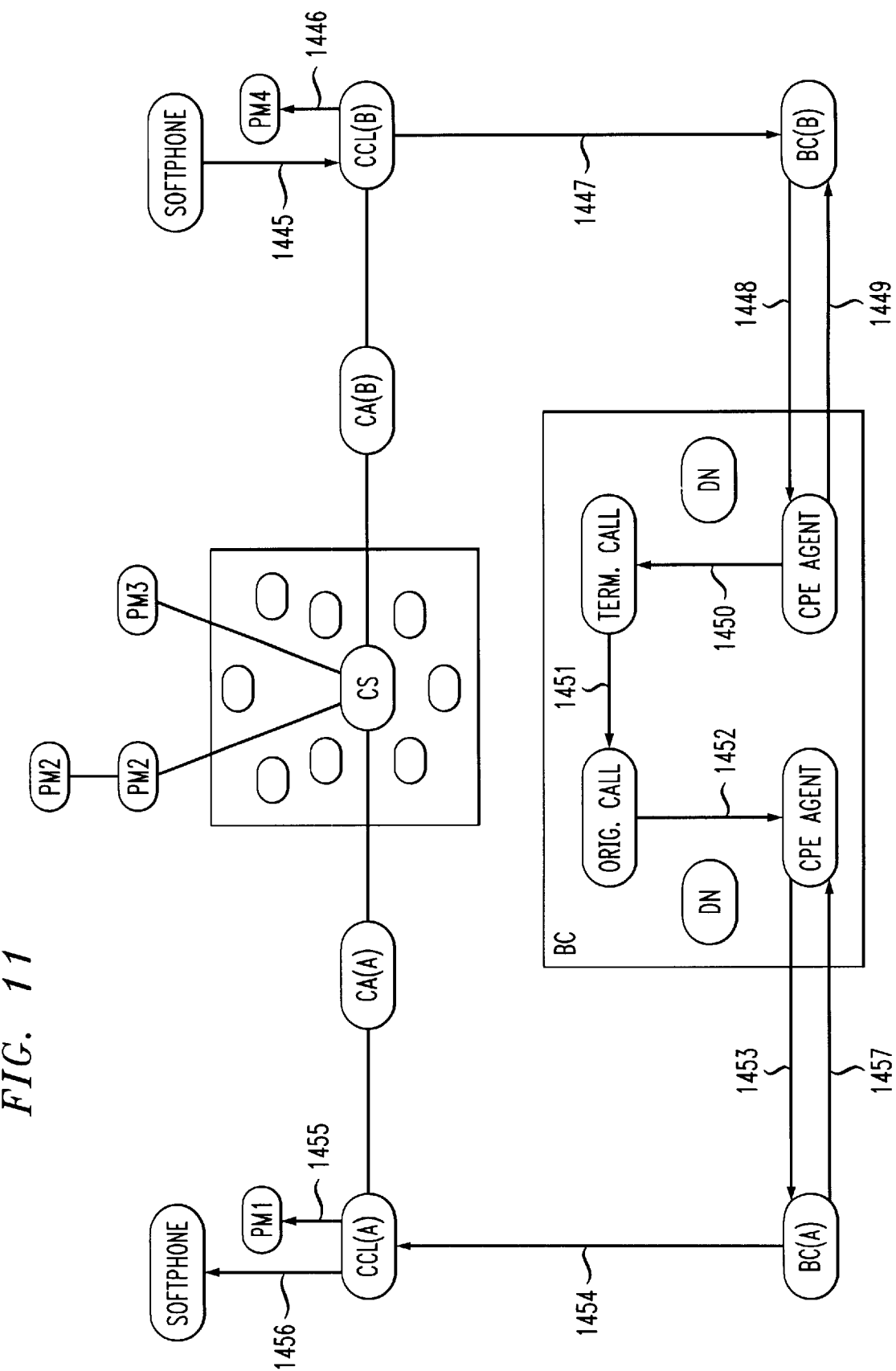
FIG. 11 is a further flow diagram illustrating operation of FIG. 5.

FIG. 11 illustrates further operations identified as 1445 to 1457 for the point to point audio/video call in the system of FIG. 5. The operations are as follows:

1445. Connect(Call_Ref=100,Conn_ID=(150,200), Media=(voice,video))

1446. Connect(Call_Ref=100,Conn_ID=(150,200), Media=(voice,video))

1447. Connect(Call_Ref=100,Conn_ID=(150,200), Media=(voice,video))

1448. Connect(Call_Ref=100,Conn_ID=(150,200), Channel_ID=Source_Port_Number(200,400))

1449. Connect_ACK(Call_Ref=100,Conn_ID=(150,200))

1450. Connect( . . . )

1451. Connect( . . . )

1452. Connect( . . . )

1453. Connect(Call_Ref=15,Conn_ID=(15,20))

1454. Connect(Call_Ref=15,Conn_ID=(15,20), Media=(voice,video))

1455. Connect(Call_Ref=15,Conn_ID=(15,20), Media=(voice,video))

1456. Connect(Call_Ref=15,Conn_ID=(15,20), Media=(voice,video))

1457. Connect_ACK(Call_Ref=15,Conn_ID=(15,20))

Figure 12:
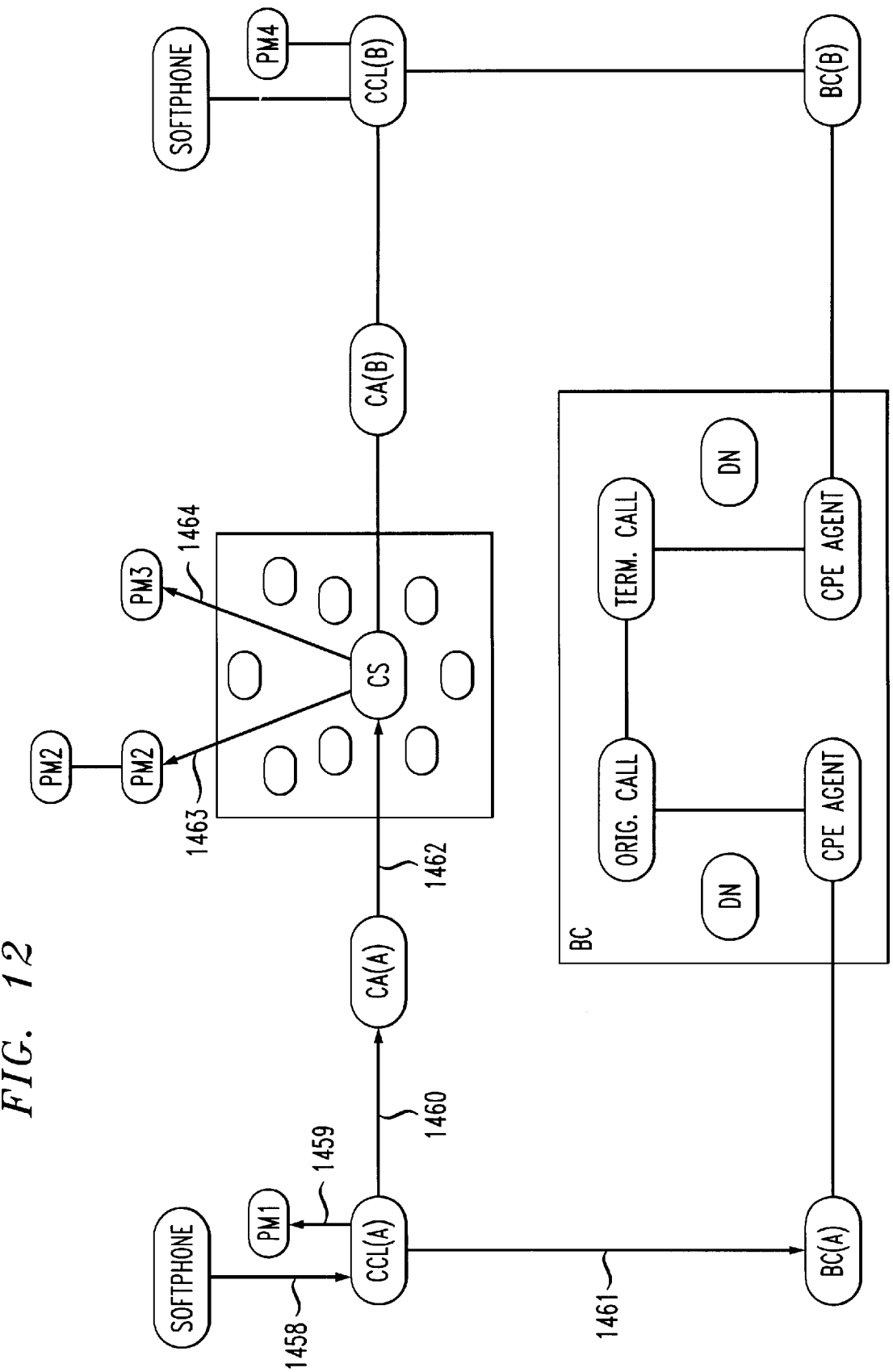
FIG. 12 is a further flow diagram illustrating operation of FIG. 5.

FIG. 12 illustrates further operations identified as 1458 to 1464 for the point to point audio/video call in the system of FIG. 5. The operations are as follows:

1458. Destroy_CallControl(Call_Ref=10, Conn_ID=(15,20), Media=(voice,video))

1459. Destroy_CallControl(Call_Ref=10, Conn_ID=(15,20), Media=voice,video))

1460. Disconnect(Call_Ref=10, Conn_ID=(15,20), Media=(voice,video))

1461. Disconnect(Call_Ref=10,Conn_ID=(15,20))

1462. Destroy_CallControl( . . . )

1463. Destroy_CallControl( . . . )

1464. Destroy_CallControl( . . . )

Figure 13:
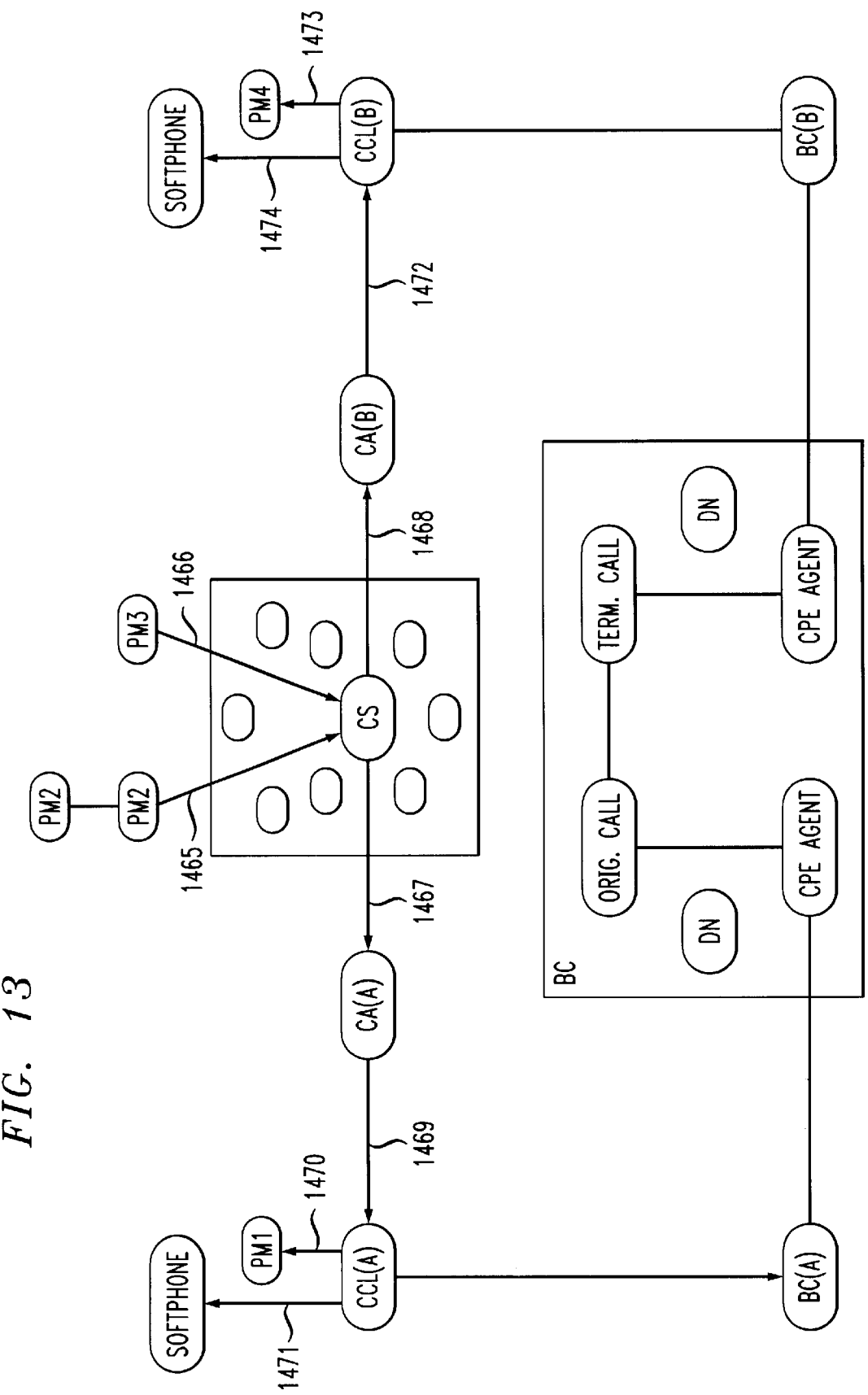
FIG. 13 is a further flow diagram illustrating operation of FIG. 5.

FIG. 13 illustrates further operations identified as 1465 to 1474 for the point to point audio/video call in the system of FIG. 5. The operations are as follows:

1465. OK

1466. OK

1467. Destroy_CallControl_End( . . . )

1468. Destroy_CallControl_End( . . . )

1469. Disconnect_ACK( . . . )

1470. Destroy_CallControl_End( . . . )

1471. Destroy_CallControl_End( . . . )

1472. Disconnect_ACK( . . . )

1473. Destroy_CallControl_End( . . . )

1474. Destroy_CallControl_End( . . . )

Figure 14:
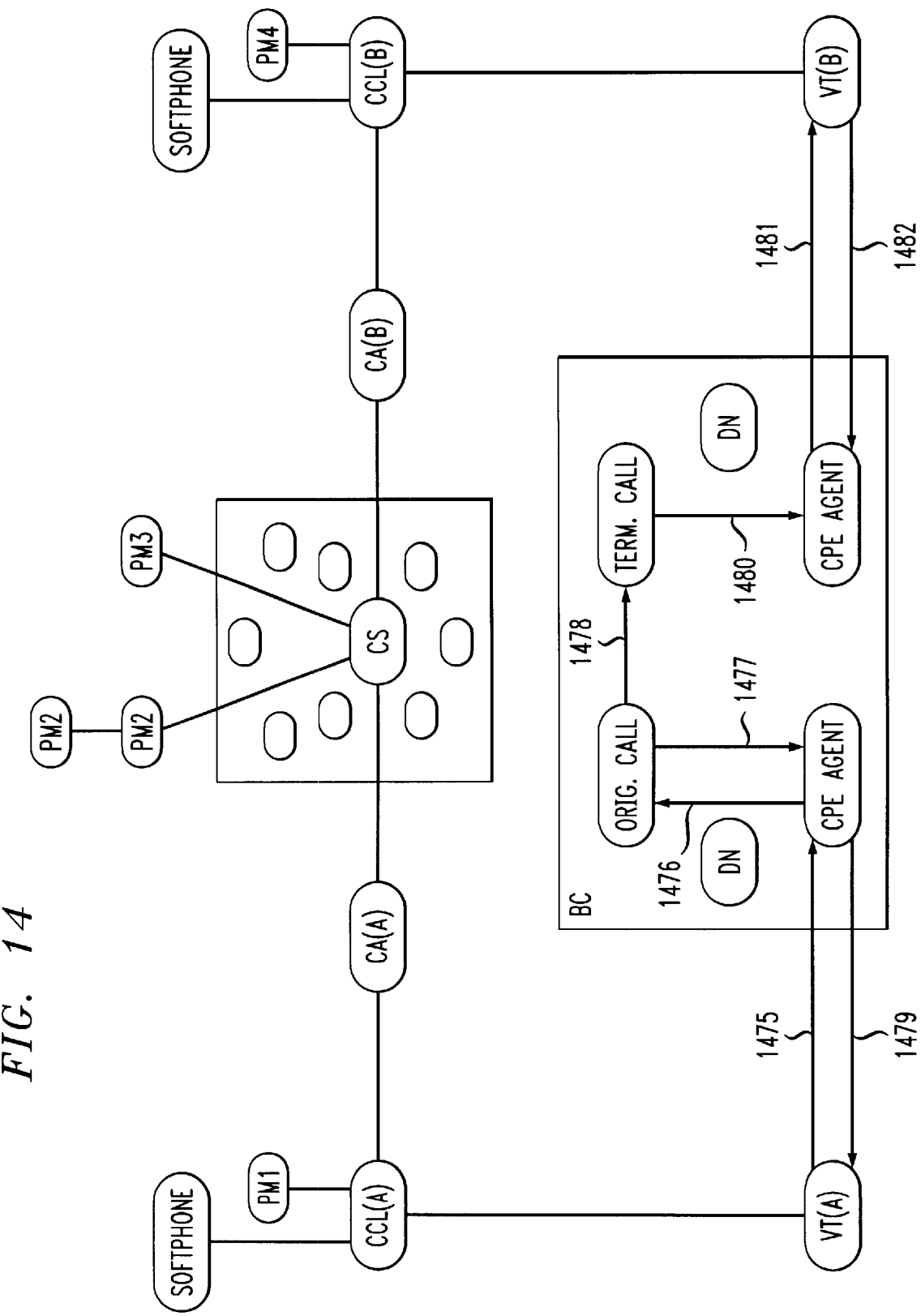
FIGS. 14 and 15 are further flow diagrams illustrating operation of FIG. 5.

FIG. 14 illustrates further operations identified as 1475 to 1482 for the point to point audio/video call in the system of FIG. 5. The operations are as follows:

1475. BearerControl_Disconnect(Call_Ref=10)

1476. BearerControl_Disconnect( . . . )

1477. Release_Channel( . . . )

1478. Disconnect( . . . )

1479. BearerControl_Release(Call_Ref=10)

1480. Disconnect( . . . )

1481. BearerControl_Disconnect(Call_Ref=150)

1482. BearerControl_Release(Call_Red=150)

Figure 15:
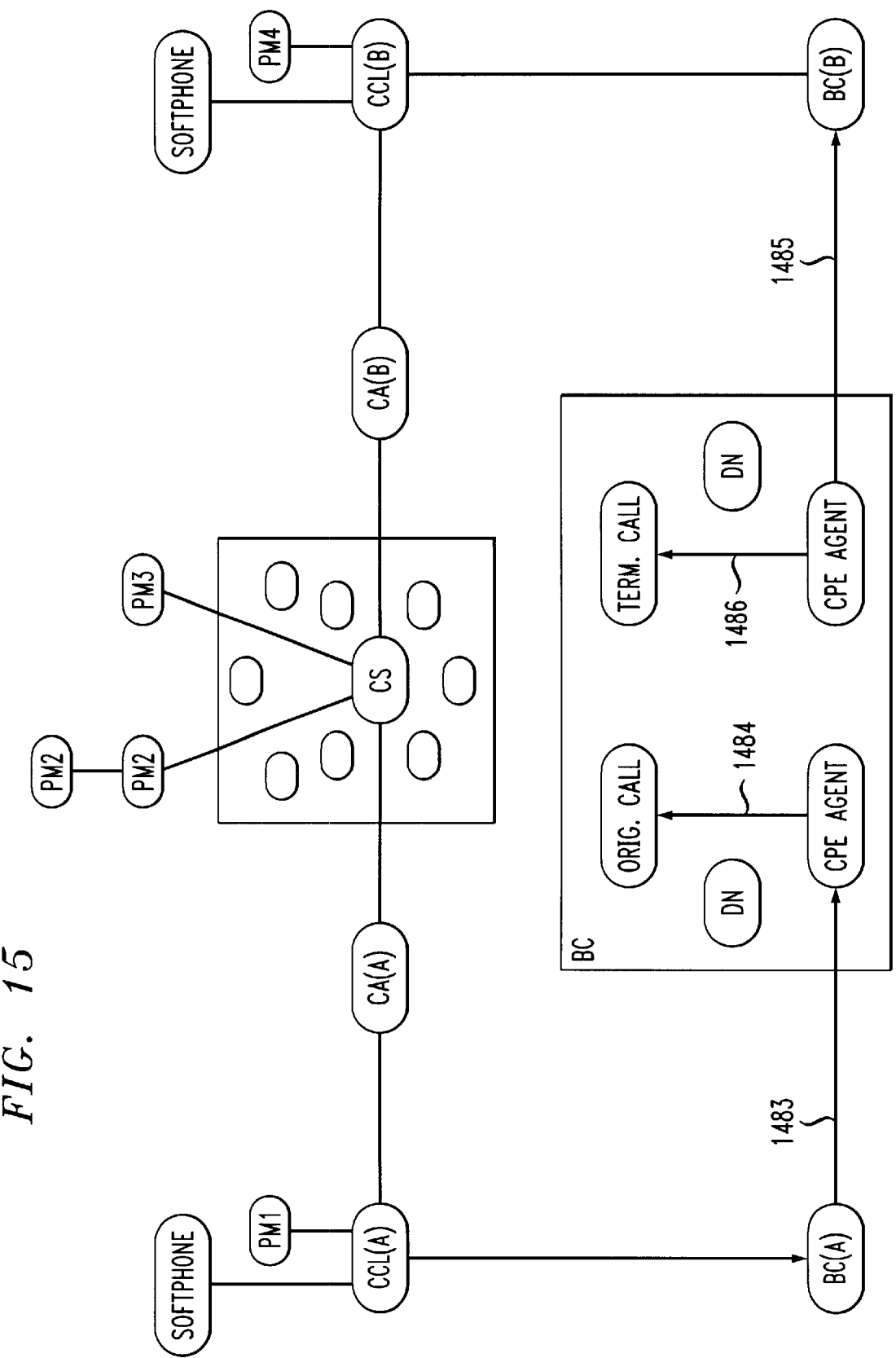

FIG. 15 illustrates further operations identified as 1483 to 1486 for the point to point audio/video call in the system of FIG. 5. The operations are as follows:

1483. BearerControl_Release_Complete (Call_Ref=10)

1484. Destroy_Object( . . . )

1485. BearerControl_Release_Complete(Call_Ref=100)

1486. Destroy_Object( . . . )

The invention involves using the BISDN signaling protocol and applying it by mapping information fields in the LAN environment to the BISDN environment and vice versa. In particular, the major mappings are transmission control protocol/user datagram protocol (TCP/UDP) port numbers in the LAN environment to VCIs and also mapping the internet address information field in the LAN environment to the calling and called directory number in the BISDN environment, and vice versa.

While embodiments of the invention have been described in detail, it will be evident to those skilled in the art that the invention may be embodied otherwise.

What is claimed is:

1. A method of managing multi-media call flows, comprising:

establishing a call in an environment having a first signaling protocol to an environment having a second signaling protocol;

identifying in the first signaling protocol that the call is going to the environment having the second signaling protocol;

replacing a first signaling element of the first signaling protocol with a corresponding second signaling element of the second protocol;

identifying in the second signaling protocol that the call is going to a second environment having the first signaling protocol;

replacing the second signaling element of the second signaling protocol with the corresponding first signaling element of the first protocol; and completing the call on the basis of the second signaling protocol with the corresponding first signaling element of the first protocol;

wherein a first user sending to a second user sends on an address and a port number address of the second user, and the second user sending to the first user sends on an address and port number of the first user.

2. A method of managing multi-media call flows as in claim 1, wherein the first signaling protocol is a local area network (LAN) protocol and said second signaling protocol is an asynchronous transfer mode (ATM) protocol.

3. A method as in claim 2, wherein said first signaling element of the first signaling protocol is a port number and said second signaling element of said second protocol is a virtual circuit identifier (VCI).

4. A method of managing multi-media call flows as in claim 1, wherein the first signaling protocol is a local area network (LAN) protocol and said second signaling protocol is a broadband integrated services digital networks (BISDN) protocol.

5. A method as in claim 4, wherein BISDN protocols are applied by mapping information fields in the LAN environment to the BISDN environment and vice versa.

6. A method as in claim 4, wherein said first signaling element of the first signaling protocol is a port number and said second signaling element of said second protocol is a virtual circuit identifier (VCI).

7. A method as in claim 1, wherein the step of replacing a first signaling element of the first signaling protocol with a corresponding second signal element of the second protocol includes mapping information fields in the second signaling protocol to the first protocol.

8. A method as in claim 7, wherein mapping includes mapping of transmission control protocol/user datagram protocol (TCP/UDP) port numbers in the second protocol to virtual channel identifiers (VCIS) and mapping internet address information field in the first protocol to calling and called directory numbers in the second protocol, and vice versa.

9. A method as in claim 7, wherein mapping includes mapping of transmission control protocol/user datagram protocol (TCP/UDP) port numbers in a LAN environment to virtual channel identifiers (VCIs) and mapping internet address information field in a LAN environment to calling and called directory numbers in a BISDN environment, and vice versa.

10. A method as in claim 7, wherein said first signaling element of the first signaling protocol is a port number and said second signaling element of said second protocol is a virtual circuit identifier (VCI).

11. A method of managing multi-media call flows as in claim 7, wherein the first signaling protocol is a local area network (LAN) protocol and said second signaling protocol is broadband integrated services digital networks (BISDN) protocol.

12. A method of managing multi-media call flows as in claim 1, wherein a local area network (LAN) connects a user to a first server, a wide area network (WAN) connects the first server to a second server and a second LAN connects the second server to a second user.

13. A method of managing multi-media call flows as in claim 12, wherein the WAN is a BISDN.

* * * * *